(12) United States Patent
Goel et al.

(10) Patent No.: US 10,518,469 B2
(45) Date of Patent: Dec. 31, 2019

(54) FACILITATING EXTRACTION OF THREE-DIMENSIONAL OBJECT WITH PRINTED HINT

(71) Applicant: Adobe Inc., San Jose, CA (US)

(72) Inventors: Naveen Prakash Goel, Noida (IN); Shivang Mittal, Bangalore (IN); Sahil Gera, Delhi (IN); Harsh Vardhan Chopra, New Delhi (IN); Ashutosh Tripathi, Bangalore (IN)

(73) Assignee: Adobe Inc., San Jose, CA (US)

( * ) Notice: Subject to any disclaimer, the term of this patent is extended or adjusted under 35 U.S.C. 154(b) by 180 days.

(21) Appl. No.: 15/670,979

(22) Filed: Aug. 7, 2017

(65) Prior Publication Data

US 2019/0039288 A1 Feb. 7, 2019

(51) Int. Cl.
| | |
|---|---|
| *B29C 64/153* | (2017.01) |
| *B22F 3/00* | (2006.01) |
| *B33Y 10/00* | (2015.01) |
| *B33Y 50/00* | (2015.01) |
| *B33Y 50/02* | (2015.01) |
| *B29C 64/165* | (2017.01) |

(Continued)

(52) U.S. Cl.
CPC ............ *B29C 64/153* (2017.08); *B22F 3/008* (2013.01); *B29C 64/165* (2017.08); *B29C 64/379* (2017.08); *B29C 64/386* (2017.08); *B33Y 10/00* (2014.12); *B33Y 50/00* (2014.12); *B33Y 50/02* (2014.12); *B22F 2003/1058* (2013.01); *B29C 64/112* (2017.08)

(58) Field of Classification Search
CPC ...... B29C 64/153; B29C 64/165; B29C 64/40; B22F 3/008; B22F 3/1055; B22F 2003/1058
See application file for complete search history.

(56) References Cited

U.S. PATENT DOCUMENTS

| | | | |
|---|---|---|---|
| 2003/0127436 A1* | 7/2003 | Darrah | G05B 19/4099 219/121.66 |
| 2010/0140550 A1* | 6/2010 | Keller | B29C 39/025 252/301.4 S |

(Continued)

OTHER PUBLICATIONS

Stava,"Stress Relief: Improving Structural Strength of 3D Printable Objects", ACM Transactions on Graphics (TOG) 31.4 (2012): 48., Aug. 2012, 11 pages.

(Continued)

*Primary Examiner* — Jason L Lazorcik
(74) *Attorney, Agent, or Firm* — SBMC

(57) ABSTRACT

The extraction of a three-dimensional (3D) object is facilitated using a printed hint, which includes an additional shape that is printed along with the 3D object in a granular-based printer bed. In example implementations, the hint is indicative of a location of the 3D object. In one example, a hint has a dimension indicative of a depth to the object in the printer bed. In another example, a position of a hint is indicative that the object is below, and a size of the hint is based on a size of the object. Some hints can also protect the object. Examples include plate and shell-shaped hints. The object is located under a plate hint or within a shell hint. Further, an appearance of the object or indications of the sturdiness of different parts of the object can be printed on the hint to facilitate a safe extraction of the object.

16 Claims, 15 Drawing Sheets

(51) Int. Cl.
*B29C 64/386* (2017.01)
*B29C 64/379* (2017.01)
*B22F 3/105* (2006.01)
*B29C 64/112* (2017.01)

(56) References Cited

U.S. PATENT DOCUMENTS

| | | | | |
|---|---|---|---|---|
| 2010/0191360 A1* | 7/2010 | Napadensky | ........... | G06T 17/00 700/98 |
| 2011/0190446 A1* | 8/2011 | Matsui | ........... | B33Y 10/00 525/56 |
| 2012/0119399 A1* | 5/2012 | Fruth | ........... | B29C 67/0077 264/39 |
| 2015/0266235 A1* | 9/2015 | Page | ........... | B22F 3/1055 264/245 |
| 2016/0221114 A1* | 8/2016 | Dietrich | ........... | B23K 15/0086 |
| 2017/0312824 A1* | 11/2017 | Harrysson | ........... | B22F 3/1021 |
| 2018/0095450 A1* | 4/2018 | Lappas | ........... | B33Y 10/00 |
| 2018/0141285 A1* | 5/2018 | Davis | ........... | B33Y 30/00 |
| 2018/0141286 A1* | 5/2018 | Davis | ........... | B33Y 30/00 |
| 2018/0169943 A1* | 6/2018 | Jussel | ........... | B29C 64/141 |
| 2018/0361510 A1* | 12/2018 | Stamp | ........... | B22F 3/1055 |
| 2018/0369912 A1* | 12/2018 | Gold | ........... | B22F 3/1055 |
| 2018/0369918 A1* | 12/2018 | Gold | ........... | B22F 3/16 |
| 2018/0370213 A1* | 12/2018 | Gold | ........... | B33Y 10/00 |
| 2019/0022946 A1* | 1/2019 | Jones | ........... | B22F 3/008 |
| 2019/0039292 A1* | 2/2019 | Abbott | ........... | B29C 64/165 |

OTHER PUBLICATIONS

Umetani,"Cross-sectional structural analysis for 3D printing optimization", ACM SIGGRAPH Asia—Technical Briefs Program, Nov. 2013, 4 pages.

Zhou,"Worst-case structural analysis", ACM Transactions on Graphics, Jul. 2013, 11 pages.

* cited by examiner

FACILITATING EXTRACTION OF THREE-DIMENSIONAL OBJECT WITH PRINTED HINT

BACKGROUND

Recently, computer printing leaped off the two-dimensional (2D) page into the three-dimensional (3D) world. Conventional 2D printing involves placing tiny grey or colored dots onto a 2D array on a sheet of paper to form the pixels of an image, such as a colorful picture or black-and-white text. In contrast, 3D printing uses a physical material to form volumetric pixels, or "voxels," to build a 3D object. Generally, 3D printers print layers of an object, one over the other, to systematically place voxels into a 3D array to build the 3D object. 3D printing may be used for a variety of applications, including manufacturing, medical field, food industry, and so forth.

3D printing is supported by a variety of types of 3D printing technologies, including additive and subtractive types of manufacturing. Subtractive manufacturing can be used with 3D printing by melting or otherwise removing portions of a material to reveal the 3D-printed object, e.g., milling. An additive manufacturing process uses some material to create a 3D object by growing or combining the material to build the 3D object.

One example of additive manufacturing process is granule-based 3D printing, which is also referred to as binder jetting, powder-bed printing, 3D inkjet printing, and so forth. With granule-based 3D printing, a granular material, such as a powder, is spread in a thin layer across a printer bed of a 3D printer. A binding agent is then selectively applied to areas of the granule layer that are to be bound together for the current layer of the 3D object being printed. The binding agent acts as an adhesive to glue, melt, weld, or otherwise bind together individual granules of a current granule layer. To apply the binding agent, a print head mechanism of the 3D printer ejects or extrudes the binding agent into areas where the granule material is to be merged together to form a base, wall, support member, decorative element, or other part of the 3D object being printed.

Granule-based 3D printing offers a number of advantages over competing 3D printing technologies. For example, the resulting 3D objects can be formed from many different materials because the granules can be produced from many different substances. Examples of substances that can be used to produce granules include ceramic, metal, sand, and plastic. As an additional advantage, 3D objects can be built using multiple different colors with a granular-based printing technique. To achieve multi-color 3D prints, different pigments are combined with the binding agent before or during the application of the binding agent to the granules. For instance, cyan, magenta, yellow, black, or white pigments can be mixed to provide a full spectrum of colors.

Conventional granule-based 3D printing techniques, however, encounter numerous challenges in comparison to other 3D printing technologies. For example, conventional techniques rely on a user to manually locate a 3D objected printed in a granule-based printer bed, which may cause breakage. At the end of each printing run with a granular-based 3D printer, for instance, the printed 3D object is hidden by layers and volumes of the granules that are used as the printing material. Because the 3D object is buried by these layers and volumes granules, unused granules are separated from the 3D objects in a printer bed. Conventional approaches to separate the 3D objects from the unused granules, however, include long and tedious extraction processes that can result in damage to the printed 3D objects, e.g., through use of manual tools and "guess work" to locate the 3D object in the printer bed. Consequently, conventional techniques used to locate a 3D object may damage the object.

SUMMARY

Techniques and systems are described to control a 3D printer by a computing device to print a hint in a printer bed to facilitate the extraction of a 3D object. The hint reduces the risk of breakage and also expedite the extraction of the 3D object. In one example, a hint is printed in conjunction with a 3D object to indicate a location of the printed 3D object within a granule-filled printer bed. The hint can also provide physical protection by acting as a shield or armor for a printed 3D object by being positioned above or around the location of the printed 3D object. These different hint implementations support a reliable extraction process with increased efficiency of printed 3D objects from a printer bed in a manner that also reduces the risk of breakage in comparison to conventional 3D printing techniques.

In example implementations, a processing system of a computing device executes a 3D object extraction module. The 3D object extraction module includes an object location determination module, a hint generation module, and a printer interface module. The location determination module is used by the computing device to determine a location at which a 3D object is to be printed in a printer bed of a 3D printer. The determination is based on an object description that is used to control printing of the 3D object by the 3D printer. The hint generation module is used by the computing device to generate a hint based on the determined location. Generation of the hint includes generating a description of the hint and a position in the printer bed for printing the hint, with the hint having a shape that is based on the 3D object.

The printer interface module is used by the computing device to control the printing of the 3D object in the printer bed by the 3D printer based on the object description and the determined location. The printer interface module also controls the printing of the hint in the printer bed by the 3D printer based on the description and the position of the hint, with the printed hint indicative of the determined location of the 3D object in the printer bed.

Thus, a printed hint indicates a location of a 3D object in a printer bed of a granular-based 3D printer. In one instance, a dimension of an architected shape for the printed hint indicates a depth in the printer bed to the location of the 3D object. In another instance, a position of the printed hint within the printer bed indicates that the location of the 3D object is under the printed hint. Alternatively, the position of the printed hint within the printer bed indicates that the location of the 3D object is encased within the printed hint. Other techniques can further facilitate the extraction of a 3D object by providing information about the printed 3D object. For example, a projected appearance of the 3D object can be printed on the hint that is positioned above the printed 3D object, with the projection indicative of an identification or an orientation of the printed 3D object within the printer bed. Alternatively, a projection of different relative strengths of different parts of the 3D object can be printed on the hint using one or more different respective physical characteristics, such as colors or textures.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference number in different instances in the description and the figures may indicate similar or identical items. Further, items represented in the figures may be indicative of one or more items, and thus reference may be made interchangeably to single or plural forms of the items in the description or in the drawings.

DETAILED DESCRIPTION

Overview

Figure 1:
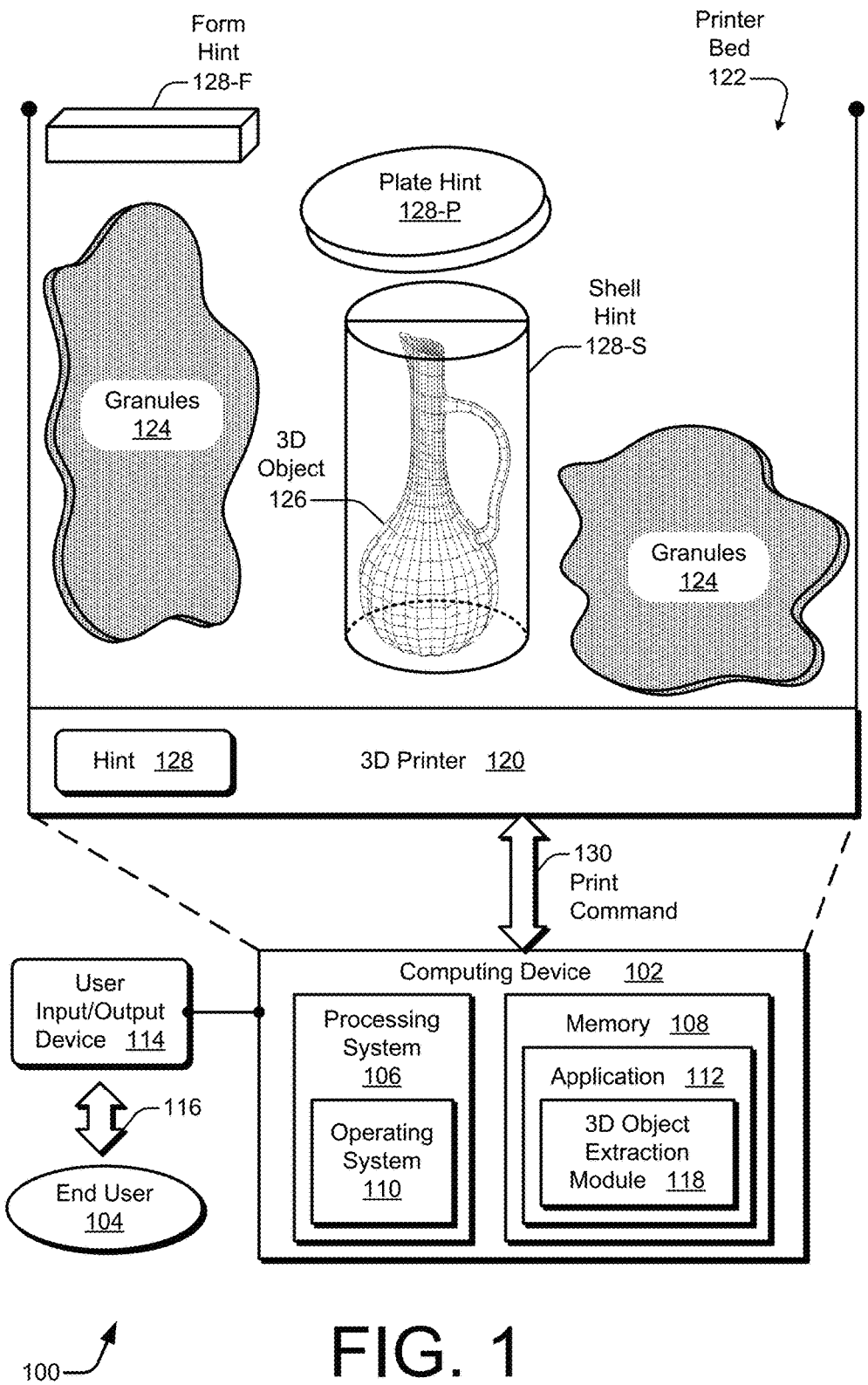
FIG. 1 illustrates an environment having a system for example implementations of printing hints to facilitate extraction of 3D objects from a printer bed, which system operates under the control of a 3D object extraction module.

There are a variety of different types of 3D printing that may be used by a computing device to print a 3D object. In one example, 3D objects are printed from granular particles, i.e., granules. During the 3D printing process, granules are spread layer-by-layer across a printer bed. The printer bed typically forms a box having a length, width, and depth to contain a printed 3D object and surrounding granules. At each planar layer of a 3D object, the 3D printer applies a binding agent as controlled by a computing device to cause some of the granules to adhere to each other, e.g., at each planar layer. In practice, however, after printing of a desired 3D object the printer bed is typically filled with granules that are not part of the 3D object and have effectively buried the 3D object. Thus, the printed 3D object is hidden by layers and volumes of the granules that are used as the printing material.

On one hand, filling the printer bed with granules during a printing run enables 3D objects that are currently being constructed to be automatically supported by the unused granules during the printing process. On the other hand, the box that forms the printer bed becomes occupied with granules, so the printed 3D objects are often completely obscured by the granules at the end of the printing run. Thus, the entire volume of the printer bed can be filled with granules that hide the locations, outlines, and vulnerable parts of the various 3D objects that are to be extracted. After a printing run, the printer bed is therefore analogous to the guesswork faced by an anthropologist that wishes to excavate a site to retrieve pottery fragments left by an ancient civilization.

Consequently, conventional techniques for 3D object extraction often rely on guesswork, slow and careful exploration, and tedious work with small, gentle brushes. These conventional granular-based 3D printers are less efficient and have increased operational expense. Payroll costs, for instance, are typically higher due to the hours involved in this slow, manual approach to the extraction process. Additionally, the expensive infrastructure for 3D printing, such as the 3D printer itself and the accompanying manufacturing space, is underutilized as the 3D objects for a previous print batch must be extracted before a new print batch can be started. This results in reduced productivity because fewer printing batches can be completed each day. Further, even if a deft touch and slow pace is used to extract the 3D object, the guesswork associated with conventional techniques results in some 3D objects being broken during the extraction process. This breakage exacerbates the overall costs to businesses because the broken 3D objects have to be reprinted, which involves consuming more 3D printing supplies and using additional time with the 3D printing equipment.

In contrast with the guesswork involved with conventional approaches, techniques and systems described herein are used by a computing device to control a 3D printer to produce hints in a printer bed that facilitate the extraction of 3D objects. A hint is defined by a computing device and caused to be printed in the printer bed in addition to a corresponding 3D object by a 3D printer. The hint explicitly or implicitly indicates a location of the corresponding 3D object within a printer bed and can also provide information about the 3D object that further facilitates a safe and efficient extraction.

In one example, a size or a position of a printed hint indicates a location of a 3D object within a granule-filled printer bed. The printed hint can also form a protective barrier (e.g., a shield or armor) over at least part of the 3D object to reduce the likelihood that a wayward hand or stray brush inadvertently makes contact with the 3D object. Further, a printed hint can provide an indication of an appearance of a 3D object or an indication of which parts of a 3D object are sturdy versus which are fragile. These various implementations of printed hints facilitate a faster and safer extraction process for 3D objects from a printer bed, which saves both time and expense in comparison with conventional techniques.

In example implementations, a 3D object extraction module executes on a computing device and causes a 3D printer to build a hint in conjunction with a 3D object being printed. The 3D object extraction module is used by the computing device to design the hint to explicitly or implicitly indicate where the 3D object is located within the printer bed. For example, a printed hint can include an architected form having a dimension that explicitly represents some distance to the location of the 3D object. Alternatively, a printed hint can be positioned within the printer bed in a manner that implicitly indicates the location of the 3D object relative to the position of the hint (e.g., indicates that the 3D object is below at least a portion of the printed hint). Thus, the 3D objection extraction module designs and prints a hint so that the location of the 3D object is indicated to a user that is responsible for then extracting the corresponding 3D object that is hidden by granules in a printer bed.

By indicating a location of a 3D object in a printer bed, a printed hint reduces much of the guesswork that is otherwise involved in the extraction process. The presence of printed hints therefore facilitates object extraction accuracy, including at a macro level that spans across the printer bed with respect to multiple hidden 3D objects. However, a hint can also be printed in a manner that facilitates object extraction at a micro level, including facilitating the removal of a single corresponding 3D object. Some 3D objects have, for example, a sturdy base in combination with exposed delicate structures, more fragile parts as well as less fragile ones, and so forth. The structure or location of these various parts with different relative strengths can be indicated using a hint. To do so, the 3D object extraction module is used by a computing device to control printing of a projection of some aspect of the 3D object as part of the hint. For instance, an appearance of the 3D object or different relative strengths of different parts of the 3D object (e.g., a strength heat map) can be projected onto the printed hint. With such a projection, the speed of extraction can be increased while simultaneously reducing the likelihood of the 3D object being broken during the extraction process.

Examples of hint shapes include a form, a plate, and a shell. These various hint shapes can be implemented individually or in combination for one or more printed 3D objects. A form can have any architecture that includes at least one adjustable dimension. Such a form can be printed at or near the top of the printer bed. For instance, a bar can have a length that is set to indicate a depth from the top of the printer bed to a 3D object. A plate-shaped hint can be positioned above a 3D object with a known gap, or gap range, between the printed plate hint and the 3D object. Additional information to facilitate extraction of the 3D object can be provided with a plate-shaped hint by printing a projection of the appearance of the 3D object onto a surface of the plate. The projected appearance therefore indicates an orientation of the 3D object under the plate.

A shell-shaped hint can be formed using a convex hull with a 3D object being encased within the printed shell. Thus, a shell-shaped hint indicates the location of the 3D object as being within the shell, as well as being below a top portion of the shell. In addition to indicating a location, the shell also serves to protect the 3D object. Further, the shell enables a user to retrieve the 3D object from the printer bed by lifting the shell. A shell-shaped hint can also be enhanced with multiple physical characteristics, which are created with a color or a texture, by printing the physical characteristics on an exterior surface of the shell. Different physical characteristics can indicate different relative weak or strong parts of the encased 3D object to further facilitate an informed, careful extraction of the 3D object from the shell.

In the following discussion, after some example terminology is set forth, an example environment is described that may employ the techniques described herein. Example implementations of systems, apparatuses, and techniques are also described, followed by a section explaining example procedural implementations. The procedures may be performed in the example environment and systems as well as in other environments and systems. However, performance of the example procedures is not limited to the example environment and systems, and the example environment and systems are not limited to performance of the example procedures.

Terminology Examples

Example descriptions or explanations of certain terms as used herein are set forth below. Each term is applicable to one or more, but not necessarily all, implementations presented herein. Some terms are further elucidated using one or more examples.

A "granular-based printing technique" refers to using a 3D printer to build a 3D object with granules, such as a ceramic powder. The 3D printer spreads a layer of granules across a printer bed of the 3D printer. The 3D printer then applies a binding agent to cause granules in selected areas to bind together in the current layer, as well as to the underlying layer, to thereby build parts of the 3D object layer-by-layer.

A "printer bed" refers to a volume of space defined by a 3D printer where the 3D printer builds 3D objects. With a granular-based 3D printer, the printer bed becomes filled with granules while the 3D printer is printing 3D objects using the granules.

A "3D object" refers to a physical item having some structure that is created using a 3D printer, such as one that uses granules to build the 3D object. A 3D object can have a length, a width, and a height and occupies some space within a printer bed. An "object description" refers to a set of physical specifications or instructions that set forth a structure of a 3D object. The structure can include a base, a wall, a supporting member, lattice work, an arch, load-bearing parts, decorative parts, combinations thereof, and so forth. A 3D printer builds a 3D object using a printing mechanism (e.g., a 3D print head) and printing supplies (e.g., granules and a binding agent) based on an object description.

A "location" or a "determined location" of a 3D object refers to where in a printer bed a 3D printer builds (e.g., will build, is building, or has built) the 3D object. The location can be specified in terms of a coordinate point, a coordinate point in conjunction with a size or description of the 3D object, a specified area in a plane of the printer bed, a volume of space that is reserved to occupy the printed 3D object, two coordinate points that are indicated to be at opposite corners of a box, some combination thereof, and so forth.

A "hint" refers to a shape and an associated position thereof. Each hint is designed to correspond to at least one 3D object. The hint is printed along with the corresponding 3D object in a printer bed of a 3D printer. The printed hint is indicative of the location of the 3D object within the printer bed. More specifically, the shape or the position of the printed hint can indicate the location of the 3D object. A hint can also provide other information about the 3D object to further facilitate extraction of the 3D object from the printer bed of the 3D printer. For example, a hint can indicate a size of the 3D object, a visual appearance of the 3D object, an orientation of the 3D object within the printer bed, relative weak versus strong parts of the printed 3D object, and combinations thereof.

A "shape" refers to a physical structure or appearance of the hint. The shape of the hint is built within a printer bed of a 3D printer. Examples of shapes may include a general architected form, a plate, a shell, and combinations thereof. A shape is associated with a description and a position of the corresponding hint.

A "description" of a hint or "hint description" refers to a set of specifications or instructions that set forth a physical structure of the hint. A 3D printer can build the hint based on the description. The description can include, for instance, measurements of dimensions for walls, planes, supporting members, and so forth. A "position" of a hint refers to where in a printer bed a 3D printer builds the hint. The position can be specified independently of or relative to a location of a corresponding 3D object.

A "form" refers to any architected shape having a dimension that can be adjusted to indicate a location of at least one 3D object. For example, a form hint can include a dimension that is based on a distance to the 3D object within a printer bed.

A "plate" refers to a shape having a flat or planar section that can be positioned above a corresponding 3D object. A plate hint indicates that the location of the 3D object is under the plate and serves as a shield to protect the 3D object. A plate hint can further include an indication of the visual appearance or the relative strengths of different parts of the corresponding 3D object. The indication is formed using physical characteristics that are printed on a surface of the plate. Examples of physical characteristics include colors, textures, and combinations thereof.

A "shell" refers to a shape that includes a volumetric hull (e.g., a convex hull) that can be positioned so as to surround a corresponding 3D object during the printing process. A shell hint indicates that the location of the 3D object is below a top portion of the shell and within the overall shell. The shell hint also serves as armor to protect the 3D object and can be used to safely lift the 3D object out of the printer bed. A shell hint can further include an indication of the visual appearance or the relative strengths of different parts of the corresponding 3D object.

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this description.

Example Environment

FIG. 1 illustrates an environment having a system 100 for example implementations of control of printing of hints 128 by a computing device to facilitate extraction of three-dimensional (3D) objects 126 from a printer bed 122. The system operates under the control of a 3D object extraction module 118. As illustrated, the example system 100 includes at least one computing device 102 and at least one user input/output (I/O) device 114. The computing device 102 includes a processing system 106 and a memory 108. The processing system 106 includes an operating system 110. The memory 108 stores an application 112, which includes the 3D object extraction module 118. The example environment of FIG. 1 also depicts an end user 104 and a user interaction between the end user 104 and the user I/O device 114 that produces a user control signal 116. Example implementations for the computing device 102 and the 3D object extraction module 118 are described further below in this section.

The environment further includes a 3D printer 120 and an associated printer bed 122. The 3D printer 120 prints 3D objects 126 in the printer bed 122 layer by layer using granules 124 in this example. The granules 124 can be formed from a variety of materials, examples of which include metal, ceramic, plastic, sand, some combination thereof, and so forth. In operation, the application 112 is executed by the computing device 102 to provide a print command 130 to the 3D printer 120. The application 112 can form a part of or can act as the operating system 110, a printer driver, a 3D modeling program, a graphic design program, an industrial design program, a computer-aided design (CAD) program, some combination thereof, and so forth. The application 112 issues the print command 130 to the 3D printer 120 to cause the 3D printer to build the 3D object 126. By way of example, the 3D object 126 is depicted as a tall pitcher with an elongated neck and a long thin handle running parallel to the neck.

The illustrated example of the 3D object 126 includes parts that are relatively fragile and therefore subject to breakage, such as the elongated neck or the thin handle. If no hints 128 are present, a lengthy and tedious process of extraction is typically used to slowly dig the 3D object 126 out of the granules 124 to enable the object to be removed from the printer bed 122. However, even if extreme care is exercised, there is still a chance that the 3D object 126 (e.g., the pitcher) will be inadvertently damaged if the extraction process is based on mere guesswork. To ameliorate this situation, the 3D object extraction module 118 controls the printer 120 to provide at least one hint 128 that is printed in the printer bed 122 along with the 3D object 126. The printed hint 128 expedites the extraction of the 3D object 126 and significantly reduces the chance of breakage. Three example types of hints 128 are shown, but other hint types may alternatively be implemented.

The three illustrated types of hints 128 have three different shapes: a general form hint 128-F; a shell-shaped hint, or shell hint 128-S; and a plate-shaped hint, or plate hint 128-P. Each hint 128 is indicative, explicitly or implicitly, of a location at which the 3D object 126 is printed within the printer bed 122. At least some of the types of hints 128 can also provide a measure of protection by acting as a barrier between a hand or a tool that is digging around the granules 124 and the 3D object 126 that is being extracted. Furthermore, a hint 128 can provide an indication of some aspect of the 3D object 126, such as a visual appearance of the 3D object 126 or parts of relative weakness or strength of the structure of the 3D object 126.

Although three types of hints 128 are jointly deployed in FIG. 1, each type of hint 128 can be used separately or in any combination. For instance, the 3D object extraction module 118 can command the 3D printer 120 to print the form hint 128-F and the shell hint 128-S without including a plate hint 128-P. Regardless, with one or more of these hints 128 acting as a signpost to guide extraction, the 3D object 126 can be retrieved with increased efficiency and safety in comparison with conventional approaches that lack such hints. Example implementations of the 3D object extraction module 118 and other general principles are described below with reference to FIGS. 2 and 3.

With continuing reference to FIG. 1, the form hint 128-F can be designed to have a dimension that is indicative of a depth in the printer bed 122 at which the top of the 3D object 126 is located. Example implementations of a form hint 128-F are described with reference to FIG. 4. The shell hint 128-S can substantially enclose the 3D object 126 like armor to prevent a wayward brush from breaking the handle or chipping the spout of the illustrated pitcher. Further, a surface of a shell hint 128-S can include physical characteristics, such as colored spots, that reveal what parts of the 3D object 126 within the shell are relatively fragile or sturdy. Example implementations of a shell hint 128-S are described with reference to FIGS. 5-7. The plate hint 128-P can cover the 3D object 126 like a shield to protect the 3D object 126 or the shell hint 128-S. The plate hint 128-P can also provide a warning that the excavation process is nearing the location of the 3D object 126. Additionally, a surface of a plate hint 128-P can include a projection of a visual appearance of the 3D object 126 to convey an image of the overall structure or of the positions of particular parts of the 3D object 126. Example implementations of a plate hint 128-P are described with reference to FIGS. 8-10.

Regarding the system 100, the computing device 102 can be implemented as any suitable type of computing device. Examples of end-user implementations for the computing device 102 include a desktop computer, a laptop or notebook computer, a mobile device with an integrated display screen (e.g., assuming a handheld configuration such as a tablet, a phablet, or a mobile phone), a mobile device coupled to a separate screen, an entertainment appliance such as a smart television, a game console, a printing device with an integrated 3D printer, a wearable computing device such as a smart watch or intelligent glasses, a virtual or augmented reality device, or some combination thereof. Thus, an end-user implementation of the computing device 102 may range from a relatively high-resource device with substantial memory and processor resources (e.g., a personal computer or game console) to a relatively low-resource device with constrained memory or processing resources (e.g., a mobile device such as a wearable computer). Examples of data center or server device implementations for the computing device 102 include a web server, a server running open source software, a server of a proprietary design, a stand-alone server, a server blade, an allocated portion of a server farm, server functionality that is distributed across at least one data center, cloud computing functionality, or some combination thereof.

The computing device 102 is illustrated as including a variety of hardware components: a processing system 106, an example of a computer-readable storage medium illustrated as memory 108, and so forth. Other hardware components are also contemplated as described herein with reference to FIG. 15. The processing system 106 is representative of functionality to perform operations through execution of instructions stored in the memory 108. Although illustrated as two separate components, functionality of the processing system 106 and the memory 108 may be combined into one component (e.g., on an application specific integrated circuit (ASIC) or during operation as instructions are loaded from the memory onto a processor) or may be further divided into a greater number of components. Examples of a user I/O device 114 include a keyboard, a mouse, a touchpad, a touch screen, a microphone, a camera, an optical or accelerometer-based motion sensor, a display device such as a screen or projector, a printer, a speaker, or some combination thereof. The user I/O device 114 may be separate from or integrated with the computing device 102. The computing device 102 is further illustrated as including an operating system 110. The operating system 110 is programmed to abstract underlying hardware functionality of the computing device 102 to the application 112 that is executable on the computing device 102.

In example implementations, the 3D object extraction module 118 is resident at or executing on the computing device 102, such as by being part of the application 112 (as shown) or the operating system 110. The 3D object extraction module 118 represents functionality to implement schemes and techniques for facilitating extraction of 3D objects using a printed hint as described herein. The 3D object extraction module 118 can be implemented as at least part of a software package that executes on and specially configures one or more processors, which processors may physically realize the processing system 106; as a hardware apparatus, which may be realized as an ASIC or as the computing device 102; or using a combination of software, firmware, hardware, or fixed logic circuitry; with some combination thereof; and so forth. Although not explicitly illustrated as such, the 3D printer 120 can include a processing system 106 or a memory 108, along with a 3D object extraction module 118; or the 3D printer 120 can be integrated with the computing device 102. Additionally, as described herein with reference to FIG. 15, the 3D object extraction module 118 may be fully or partially implemented as a feature of a web-based or cloud-based service.

Systems and Techniques

Figure 2:
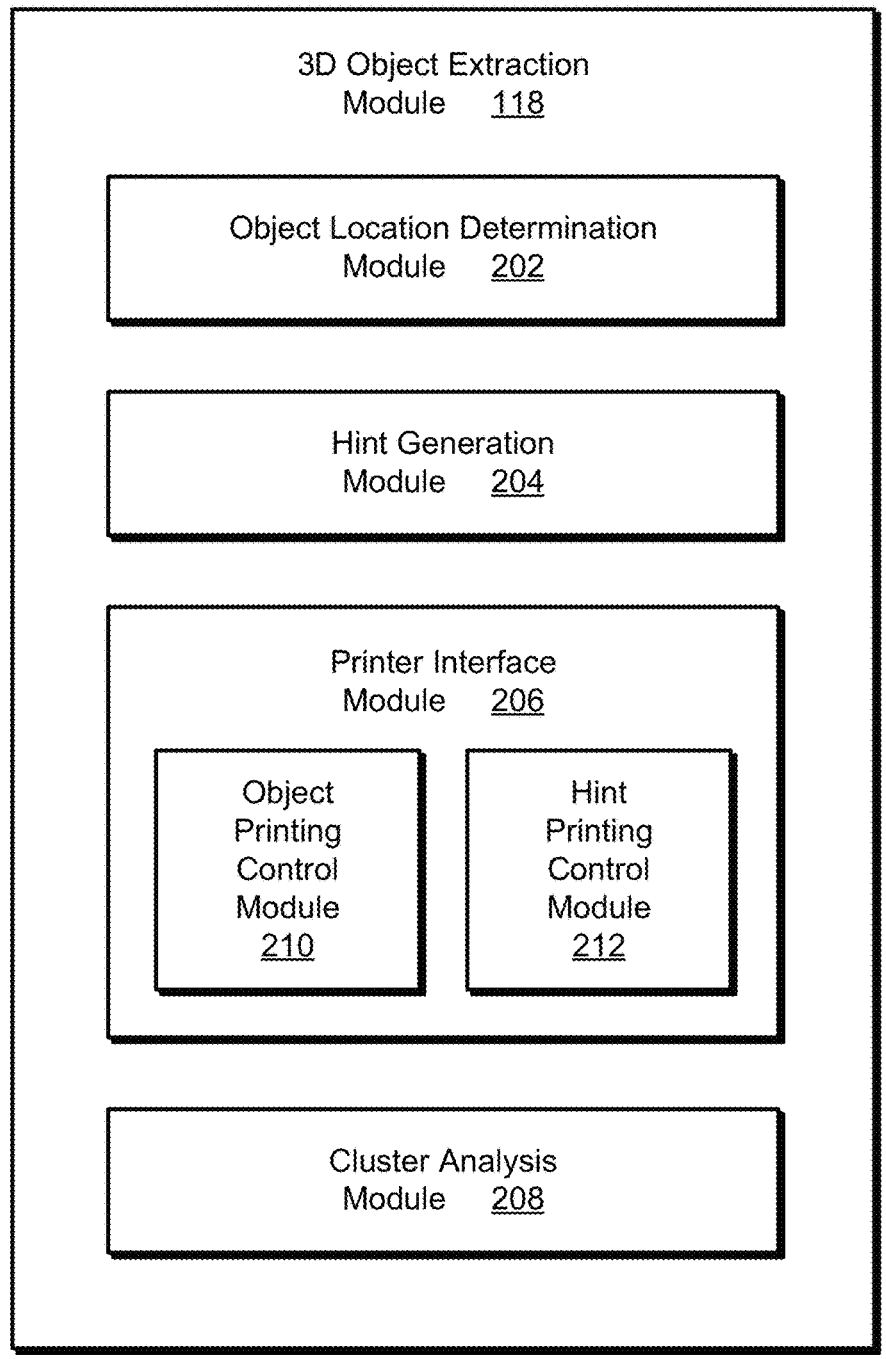
FIG. 2 depicts an example of a 3D object extraction module that includes a hint generation module and a printer interface module.

FIG. 2 depicts an example of the 3D object extraction module 118 that causes a 3D printer to print one or more hints to facilitate extraction of a 3D object. As shown, the 3D object extraction module 118 includes: an object location determination module 202, a hint generation module 204, a printer interface module 206, and a cluster analysis module 208. The printer interface module 206 includes: an object printing control module 210 and a hint printing control module 212. However, the 3D object extraction module 118 can alternatively include more, fewer, or different modules. Operations of the various modules 202-206 and 210-212 are introduced below with reference to FIG. 3 and then described further with reference to FIGS. 4-10. Operations of the cluster analysis module 208 are also described below, particularly with reference to FIGS. 9 and 10.

Any one or more of the six modules 202-212 of the 3D object extraction module 118 can be resident at or executing on an end-user computing device 102 (e.g., as depicted in FIG. 1), on a server of a data center as part of cloud computing functionality (e.g., on at least one server computing device), partially on a cloud computing device and partially on a client-side computing device to jointly implement described functionality, partially or fully on a 3D printing device, and so forth. Also, any one or more of the six modules 202-212 of the 3D object extraction module 118 can be a stand-alone module, part of the application 112 (of FIG. 1), part of the operating system 110, some combination thereof, and so forth.

Figure 3:
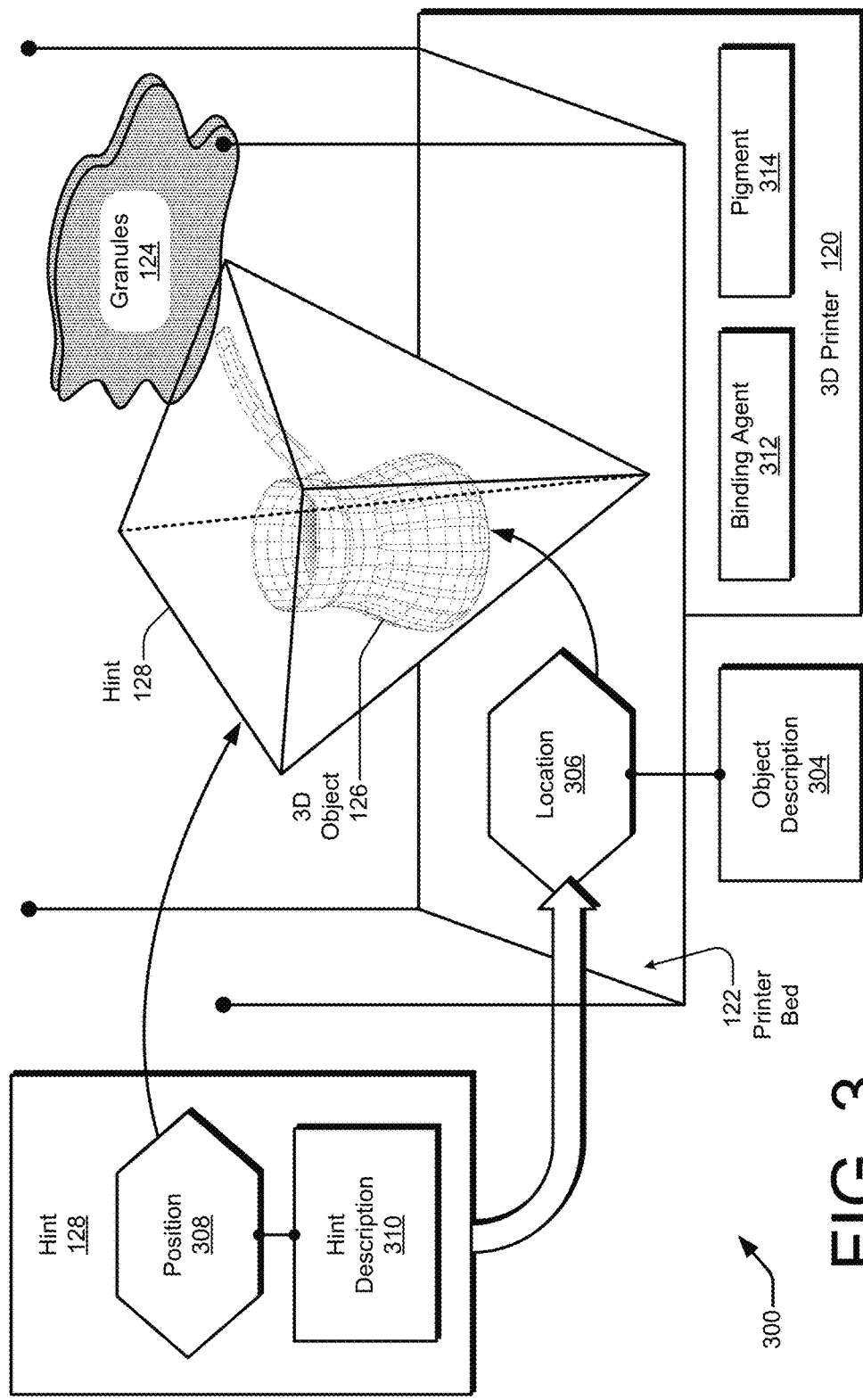
FIG. 3 illustrates an example scheme for the operation of the 3D object extraction module with regard to a hint that is generated to be indicative of a location of a 3D object in a printer bed.

FIG. 3 illustrates an example scheme 300 for the operation of the 3D object extraction module 118 (of FIG. 2) with regard to a hint 128 that is generated to be indicative of a location of a 3D object 126 in a printer bed 122. The hint 128 includes or is otherwise associated with a position 308 and a hint description 310. As shown, the 3D printer 120 includes at least one binding agent 312, at least one pigment 314, and the printer bed 122. Within the printer bed 122, there is the 3D object 126, the hint 128, and granules 124. The granules 124 permeate throughout the printer bed 122, within the 3D object 126, within the hint 128, outside of the hint 128, and so forth. Spatial information for the 3D object 126 in the printer bed 122 is referred to as a location 306, and spatial information for the hint 128 in the printer bed 122 is referred to as the position 308. Also shown is an object description 304 that is associated with the location 306 for the 3D object 126.

With reference to both FIGS. 2 and 3, the object location determination module 202 determines the location 306 for the 3D object 126, which corresponds to the object description 304. To perform the object location determination, the location 306 can be obtained from another application or device, the location 306 can be accepted as a user-specified input, the location 306 can be computed (e.g., based on one or more other 3D objects being printed in the same batch, to increase printing efficiency, to reduce printing time, or a combination thereof), some combination thereof, and so forth. The object description 304 provides a geometric structural specification of the 3D object 126. The location 306 represents an identifiable location in the printer bed 122 of the 3D printer 120 for printing the 3D object 126. Thus, the location 306 stipulates where the 3D object 126 is to be printed within the printer bed 122. The location 306 can include, for example, a coordinate point within the printer bed 122, such as for a top corner or a bottom layer of the 3D object; three points that define a plane; a box that is to contain the 3D object; or some combination thereof. Further, the location 306 can be defined jointly in terms of a starting point for printing the 3D object 126 and the structure specified by the object description 304.

The hint generation module 204 generates the hint 128 based at least on the location 306 in the printer bed 122 of the 3D printer 120. The hint 128 is generated to be indicative of the location 306 of the 3D object 126. The hint 128 includes the hint description 310 and the position 308. The hint description 310 specifies a structure for a shape of the hint 128, such as by providing a geometrical structural specification that includes height, length, thickness, and so forth of various walls, planes, members, curves, and other components of a shape of the hint 128. The hint generation module 204 generates the shape of the hint 128 based on the 3D object 126, such as the location, size, structure, or sturdiness of the 3D object 126. The position 308 stipulates a place within the printer bed 122 at which the 3D printer 120 is to print the hint 128. The position 308 can include one or more coordinate points, a box, a volume, a set of points, multiple triangles, or other geometric items for specifying at least one point or space within the printer bed 122. The position 308 can be specified in accordance with a protocol understandable by the 3D printer 120.

The printer interface module 206 provides to the 3D printer 120 at least one command to print the hint 128 in conjunction with the 3D object 126. The object printing control module 210 controls the 3D printer 120 to print the 3D object 126 using a print command including the object description 304 and the location 306. The hint printing control module 212 controls the 3D printer 120 to print the hint 128 using a print command that includes the hint description 310 and the position 308. In response to the print commands, the 3D printer 120 prints the hint 128 in conjunction with the 3D object 126 using the granules 124, the binding agent 312, and the pigment 314 (e.g., if color is being applied). The 3D printer 120 uses the binding agent 312 to cause granules 124 to adhere to each other to form the structural components of the 3D object 126 as well as those of the hint 128. Single color or multi-color patterns, shapes, designs, and other images can be printed using one or more of the pigments 314. The 3D printer 120 can combine the binding agent 312 with the pigment 314 to cause ink to be present and visible on a surface of the 3D object 126 or on a surface of the hint 128.

Figure 4:
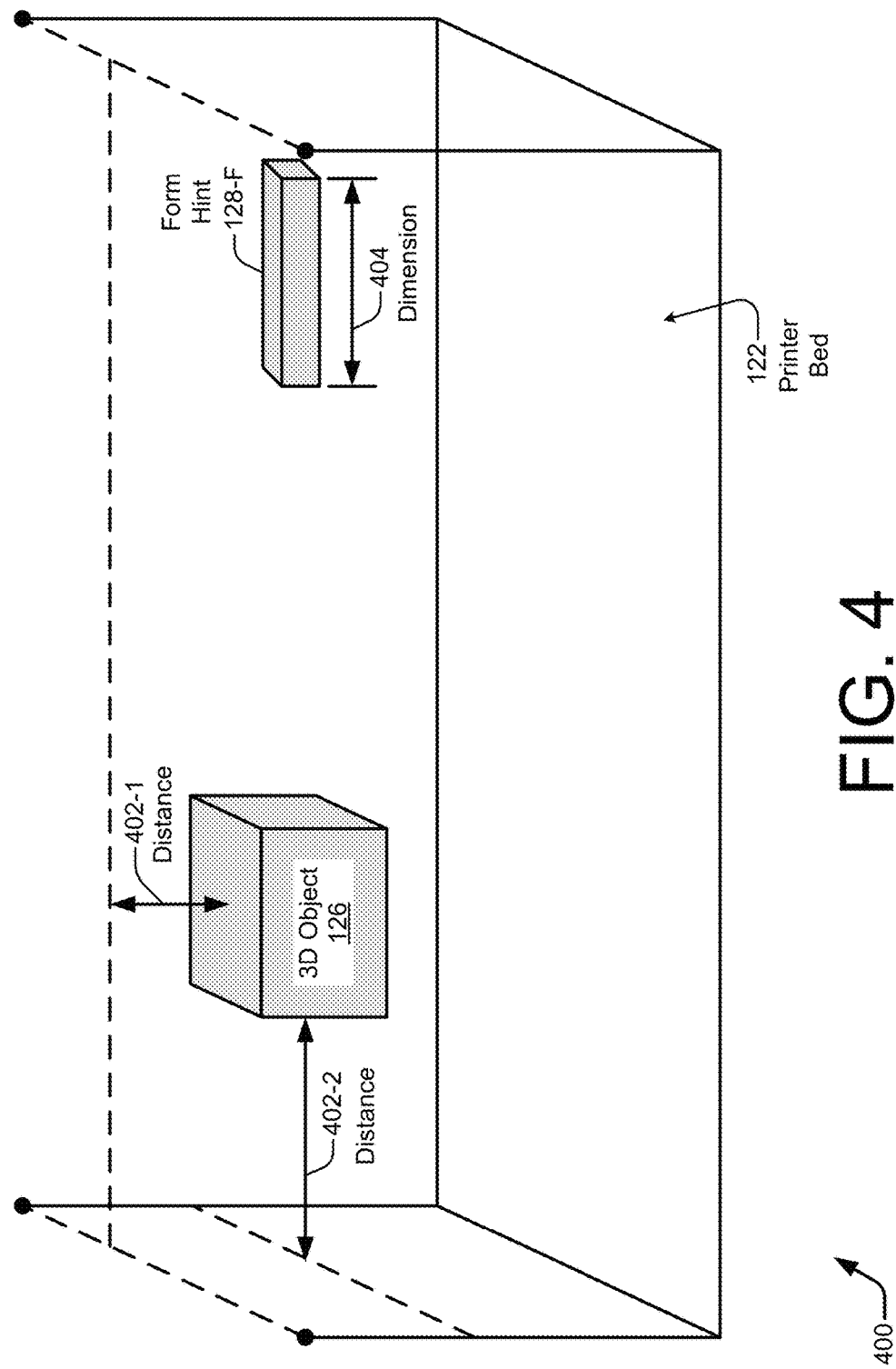
FIG. 4 depicts a printer bed illustrating an example implementation for a hint that includes a form having a dimension.

FIG. 4 depicts a printer bed 122 illustrating an example implementation for a hint that includes an architected form 128-F having a dimension 404. The 3D object 126 is located within the printer bed 122 such that the 3D object 126 is some distance 402 from a determinable point. For example, a distance 402-1 represents a depth to the 3D object 126, such as a depth to the top of the 3D object 126. The depth is measured between two points—a higher point and a lower point. Regarding the higher point, the depth can be measured, for instance, from a top of the printer bed 122, from a demarcated line of the printer bed 122 (e.g., from a maximum fill line), from a top layer of the granules 124 for a current print run, and so forth. Regarding the lower point, the depth can be measured, for instance, to a shell hint 128-S (e.g., of FIG. 1), to a plate hint 128-P, to a top of the actual 3D object 126, to where a critical section of the 3D object 126 begins, and so forth. Here, a critical section corresponds to a part of the 3D object 126 around which the end user should be cautious while extracting the 3D object 126 from the printer bed 122 due to the part having a relatively greater fragility. By indicating a depth, including to a critical section, the form hint 128-F enables an end user to handle weaker parts of a 3D object 126 more carefully during the extraction process. As another example of a distance 402, a distance 402-2 represents a span from a sidewall of the printer bed 122 to a part of the 3D object 126, such as to a topmost part of the 3D object 126 that is closest to that sidewall.

To indicate the location of the 3D object 126, the form hint 128-F is designed and printed so that the dimension 404 represents a distance 402. For example, the dimension 404 can substantially approximate the distance 402. The dimension 404, for instance, can substantially approximate the distance 402 by being equal to the distance 402 to within a level of precision that is feasible using granular-based 3D printing, by being within 10% of the same length as the distance 402, and so forth. Although shown as a linear-shaped rod, the form hint 128-F can take other shapes. For example, the form hint 128-F can be rectangular. With a rectangular form hint 128-F, the form hint 128-F can have two dimensions 404 to respectively represent two different distances 402. Thus, a single form hint 128-F can indicate both a depth distance and a lateral distance to the location of the 3D object 126. The form hint 128-F can also be built to have a portion that is suitable for grasping, such as notches or a handle; be tailored to facilitate insertion of the form hint 128-F into the granules 124, such as by being printed to include a wedge portion or a sharpened, pointed portion; and so forth.

Figure 5:
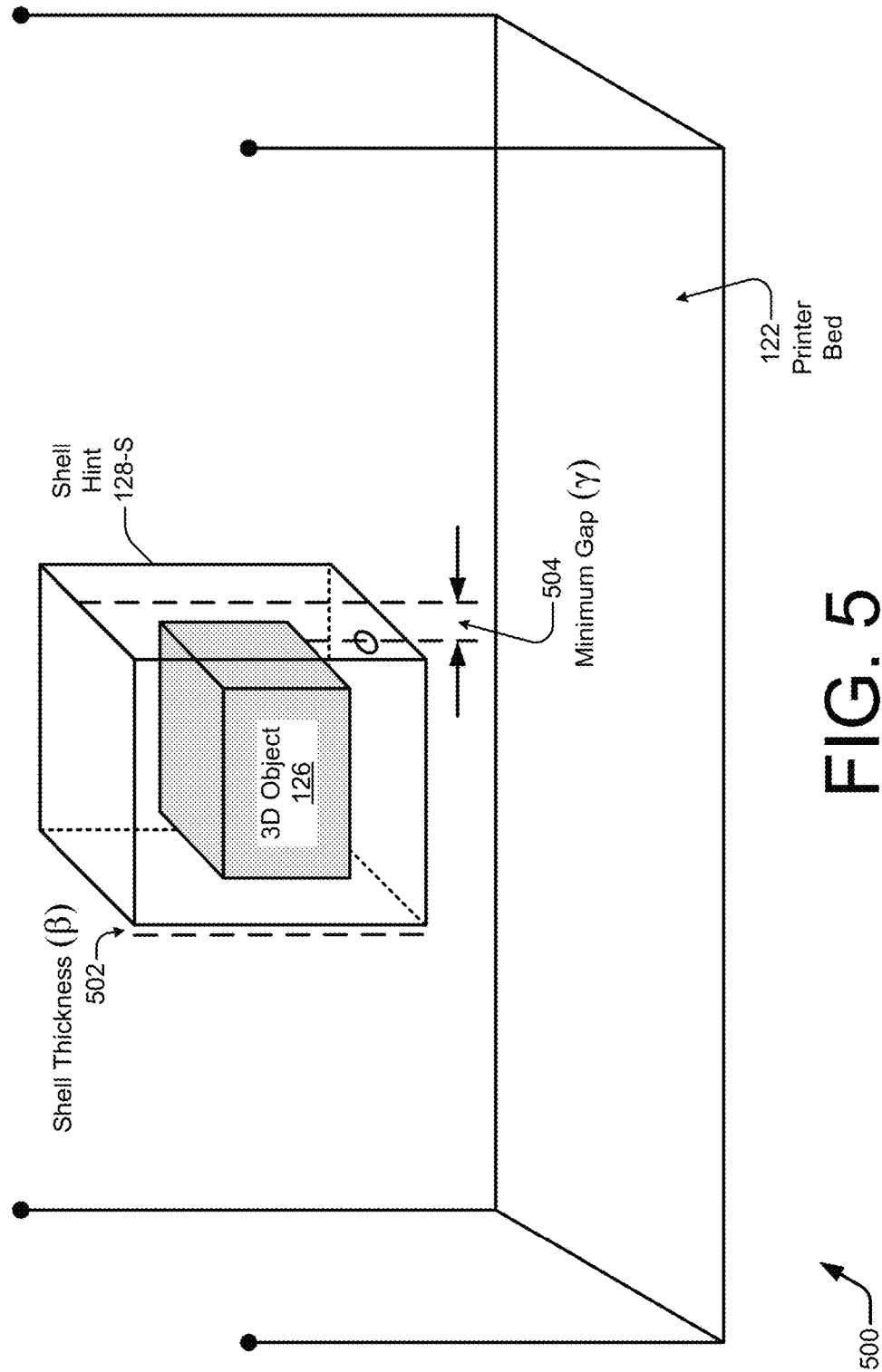
FIG. 5 depicts a printer bed illustrating an example implementation for a hint that includes a shell surrounding a 3D object.

FIG. 5 depicts a printer bed 122 illustrating an example implementation for a shell hint 128-S surrounding a 3D object 126. As shown, the shell hint 128-S is realized as a box that encloses a rectangular 3D object 126. More generally, the shell hint 128-S can be created as a convex hull that substantially surrounds the 3D object 126. To substantially surround a 3D object 126, the shell hint 128-S can form a dome that covers the 3D object 126 from the top and sides (e.g., a hemisphere, a cylinder with an open bottom end, or a box without a bottom), can completely enclose the 3D object 126 (e.g., with a sphere or a box as shown), can surround the 3D object 126 sufficiently so that the 3D object 126 can be lifted from the printer bed 122 using the shell hint 128-S (e.g., even if there are holes or gaps in the shell surface, such as for finger hole to facilitate lifting the shell), and so forth.

Two measurements are illustrated in FIG. 5 for the shell hint 128-S: a shell thickness 502 (β) and a minimum gap 504 (γ). These measurements can be specified in the hint description 310 of FIG. 3. The shell thickness 502 can be a variety of thicknesses and may vary in different portions of the shell hint 128-S in dependence on related structural support factors. In one implementation, the shell hint 128-S is designed to have a shell thickness 502 that renders the shell sufficiently strong so as to enable the 3D object 126 to be removed from the printer bed 122 of the 3D printer by lifting the shell. However, the shell thickness 502 is designed to still be sufficiently thin so as to be breakable without damaging the 3D object 126 within the shell shape. The shell hint 128-S is designed so that the minimum gap 504 is sufficient to provide a cushion around the 3D object 126 and to enable an end user to break open the shell hint 128-S without breaking the underlying 3D object 126. Example values for these measurements are 1.5-2.0 millimeters (mm) for the shell thickness 502 and 3.0-5.0 mm for the minimum gap 504. However, the 3D object extraction module 118 can set different default values or can enable an end user to select the values for the shell, including the shell thickness and minimum gap values.

Figure 6:
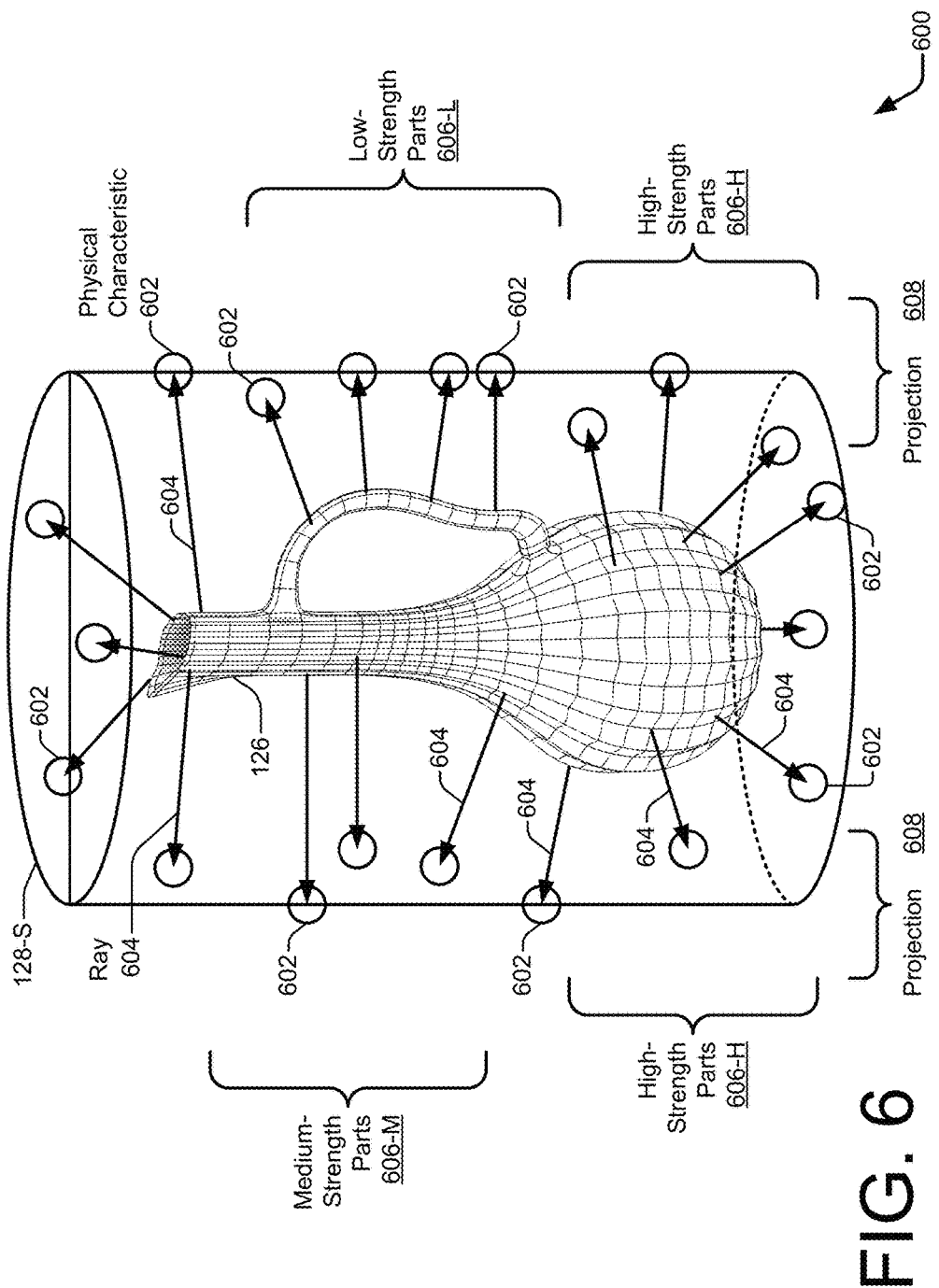
FIG. 6 illustrates a shell hint including a projection that corresponds to an aspect of a 3D object, with the projection formed from multiple physical characteristics disposed on the shell hint.
Figure 7:
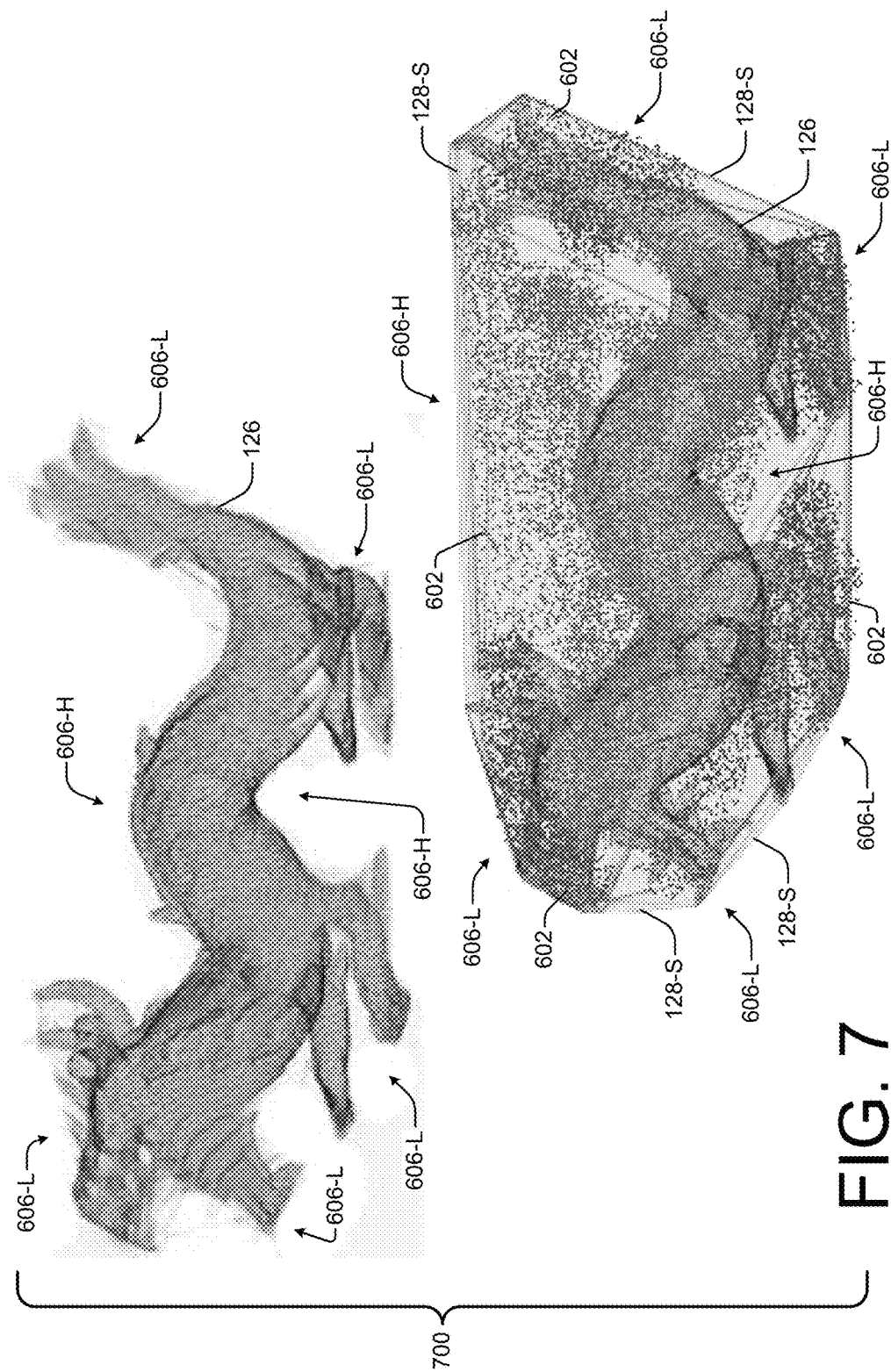
FIG. 7 illustrates an example of a 3D object alone and an example of the 3D object encased within an example shell hint, with the shell hint having physical characteristics disposed on an external surface.
Figure 8:
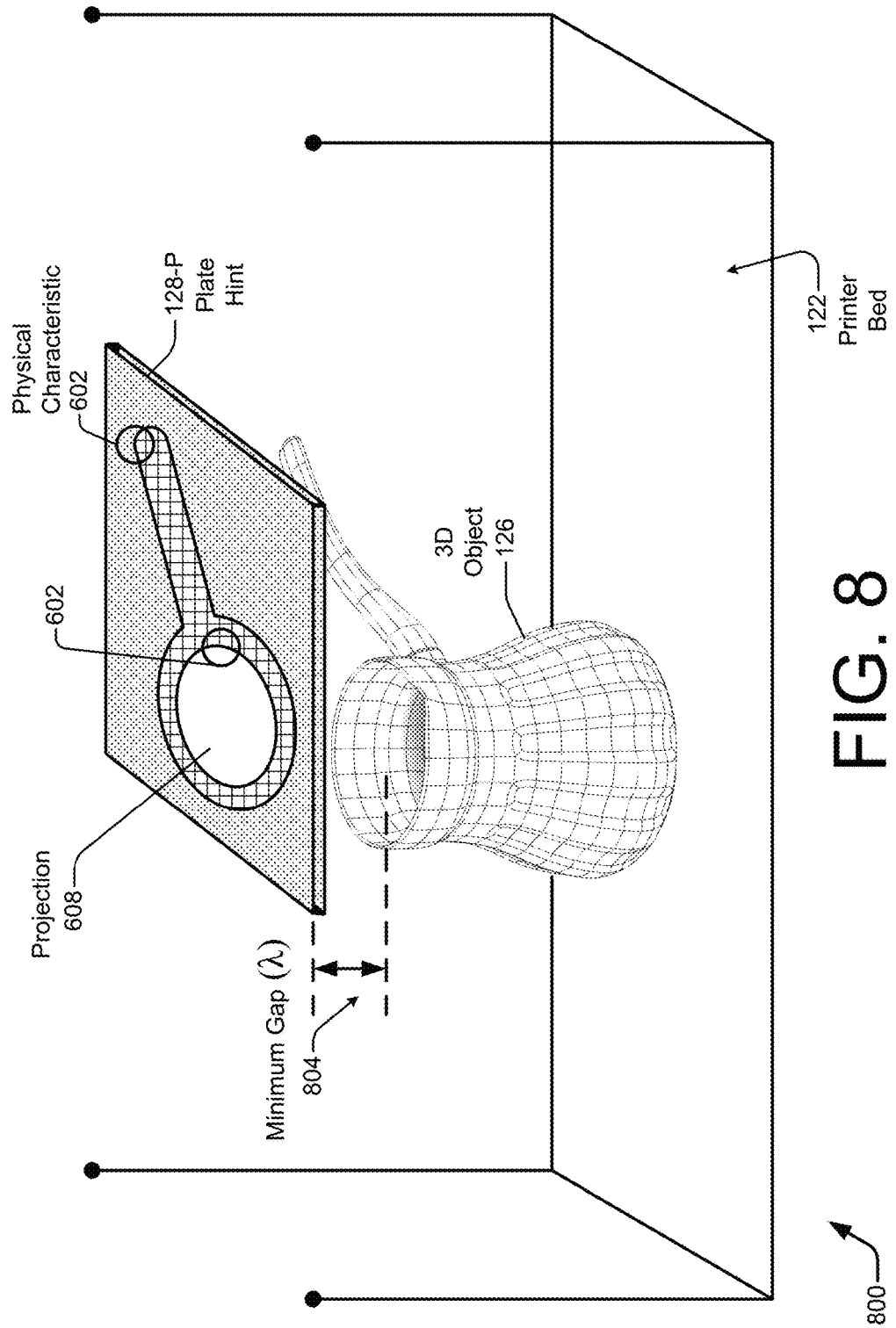
FIG. 8 depicts a printer bed illustrating an example implementation for a hint that includes a plate covering a 3D object.

As described above in the overview section, a hint 128 can include a representation of some aspect of a corresponding 3D object 126 to provide additional information to facilitate a safe and efficient extraction from a printer bed. An example aspect of a 3D object 126 can pertain to a visual appearance of the 3D object 126, to a strength heat map of the 3D object 126 that is based on different relative strengths of different parts of the 3D object 126, or a combination thereof. Of these two example aspects, FIGS. 6 and 7 are described in terms of indicating different relative strengths of different parts of a corresponding 3D object 126. FIG. 8, on the other hand, is described in terms of indicating a visual appearance of a corresponding 3D object 126. However, a shell hint 128-S, as depicted in FIGS. 6 and 7, can additionally or alternatively include an indication of a visual appearance of the 3D object 126 that is encased within. Similarly, a plate hint 128-P, as depicted in FIG. 8, can additionally or alternatively include indications of relative strength of a 3D object 126 that is located under the plate hint 128-P.

FIG. 6 illustrates generally at 600 a shell hint 128-S having physical characteristics 602, with each of the physical characteristics 602 corresponding to an aspect of a 3D object 126. The physical characteristics are depicted as circles in the drawings; for clarity, only a portion of them are designated with the reference number 602. As shown, the shell hint 128-S encapsulates a 3D object 126 that is a pitcher for storing and pouring liquids. The pitcher includes a spherical base, a narrow neck, and a thin handle that juts out from the neck and extends down to connect at the base. During the design process, the hint generation module 204 can calculate a projection 608 based on an aspect of the 3D object 126, such as by using a ray 604 as is described below. The hint generation module 204 includes the projection 608 as part of the hint description 310.

During the 3D printing process, the printer interface module 206 controls the 3D printer to create physical characteristics 602 on a surface of the shell hint 128-S in accordance with the hint description 310. Each physical characteristic 602 indicates a relative strength of a corresponding part of the 3D object 126. In other words, the multiple physical characteristics 602 that are disposed on a surface of the shell hint 128-S can form a strength heat map for the 3D object 126 that is cocooned within the shell hint 128-S. The 3D printer 120 can print the physical characteristics 602 using texture, color, some combination thereof, and so forth. For example, smooth portions of the shell hint 128-S can correspond to relatively weaker parts of the 3D object 126, and rough or bumpy portions of the shell hint 128-S can correspond to relatively stronger parts of the 3D object 126, or vice versa.

Alternatively, instead of textures, one or more colors can be printed onto the surface of the shell hint 128-S as uniformly-sized dots, variously-shaped patches, differently-sized circles, and so forth. Green, yellow, and red colors, for instance, can be used to represent high, medium, and low strength parts, respectively. In the illustrated example with the pitcher, the narrow neck region includes multiple medium-strength parts 606-M. The thin handle region includes multiple low-strength parts 606-L. The rounded base region includes multiple high-strength parts 606-H. Different parts of the 3D object 126 are respectively mapped to different physical characteristics 602 of the shell hint 128-S using respective rays, some of which are designated with the reference number 604. Thus, the physical characteristics 602 that correspond to the high-strength parts 606-H can be printed with a green color. Similarly, the physical characteristics 602 that correspond to the medium-strength parts 606-M can be colored yellow, and the physical characteristics 602 that correspond to the low-strength parts 606-L can be colored red. With this printed coloration, an end user is provided guidance as to where extra care should be taken when breaking the shell hint 128-S to retrieve the 3D object 126.

FIG. 7 illustrates generally at 700 an example of a 3D object 126 in the top half of the drawing. As is apparent in the top half, the 3D object 126 is a dragon with an elongated body that is posed on four legs with an open mouth and a tail pointing upward. Low and high strength parts 606-L and 606-H are indicated around different parts of the dragon. For example, the central body has high-strength parts 606-H, while the feet, head, and tail have low-strength parts 606-L. In the bottom half of the drawing, an example of a shell hint 128-S is shown surrounding the 3D object 126. The shell hint 128-S includes a convex hull that encapsulates the dragon object. The depicted shell hint 128-S has physical characteristics 602 that are disposed on an external surface of the shell.

Focusing on the lower half of FIG. 7, the lighter-toned physical characteristics 602 that are printed on the hull correspond to relatively high-strength parts 606-H, which include central areas around the elongated body of the dragon. The darker-toned physical characteristics 602 that are printed on the hull correspond to relatively low-strength parts 606-L. These relatively low-strength parts 606-L include areas around the head, feet, and tail of the dragon. The physical characteristics 602 that are darker-toned therefore warn an end user that the underlying parts of the 3D object 126 are relatively more fragile and therefore more prone to breakage. In FIGS. 6 and 7, one 3D object 126 is encapsulated in each shell hint 128-S; however, multiple 3D objects 126 can alternatively be enclosed within a single shell hint 128-S.

A shell hint 128-S having a convex hull to at least partially encapsulate a 3D object 126 can be designed in many different manners. For example, a core physical structure of convex hull can be generated using a Jarvis March algorithm. An example pseudo-code implementation of a Jarvis March algorithm is as follows:

```
jarvis(S)
    pointOnHull = leftmost point in S
    i = 0
    repeat
        P[i] = pointOnHull
        endpoint = S[0]      // initial endpoint for a candidate edge on
        the hull for j from 1 to |S|
                if (endpoint == pointOnHull) or (S[j] is on left of
line from [i] to endpoint)
                    endpoint = S[j]   // found greater left turn,
                update endpoint i = i+1
                pointOnHull = endpoint
    until endpoint == P[0]            // wrapped around to first hull point.
```

After a core physical structure of the shell hint 128-S is generated for the hint description 310, multiple physical characteristics 602 for a surface of the shell hint 128-S can be determined. If the physical characteristics 602 are to jointly represent a strength heat map indicative of different relative strengths of different parts of a 3D object 126, the relative strengths of the different parts of the 3D object 126 are calculated. This strength analysis can be performed using, e.g., any of many different kinds of structural analysis. For example, there are many traditional Finite Element Methods (FEMs) that can be used for structural analysis. Furthermore, there are techniques for structural analysis that are tailored to 3D printing applications. For instance, one method combines a lightweight structural analysis solver with 3D medial axis approximations. Another method employs a cross-sectional structural analysis that uses geometric and material properties that are based on Euler-Bernoulli assumptions.

To indicate to a user the weak or low-strength parts 606-L of a 3D object 126, the corresponding portions of the shell hint 128-S are marked accordingly. The corresponding portions of the shell hint 128-S can be marked using distinctive colors so that the corresponding parts of the 3D object 126 are easily identifiable during the extraction process. The corresponding portions on the shell hint 128-S at which physical characteristics 602 are to be marked can be determined using rays 604, which are shown in FIG. 6. From each vertex of the model for the 3D object 126 that is identified as weak, a ray 604 is cast towards the convex hull along the line joining the vertex-average of the hull and the vertex of the model currently under consideration. The point determined by the incident location of the ray 604 is color coded on the external surface of the shell hint 128-S as being weak to establish the physical characteristic 602. The locations and colors for physical characteristics 602 for medium, high, or other strength levels can be determined similarly.

The vertex-average of a convex hull can be approximated using the formula below in Equation (1):

$$C_{hull} = \frac{\sum_{i=1}^{n} P_{hull}}{n}. \quad (1)$$

In Equation (1), $P_{hull}$ is the point on the convex hull, $C_{hull}$ is the vertex-average for the convex hull, and n is the number of points on the hull. Given the vertex-center, the cast of each vertex point on the surface of the model of the 3D object onto a point on the convex hull can be calculated using Equation (2):

$$P'_{hull} = \lambda \times \left( \frac{P - C_{hull}}{|P - C_{hull}|} \right) + P. \quad (2)$$

Given P as the vertex point on the surface of the model from where the ray 604 is cast and $C_{hull}$ as the vertex-center of the hull, Equation (2) is then solved for the point $P'_{hull}$ for the corresponding physical characteristic 602.

FIG. 8 depicts a printer bed 122 illustrating an example implementation for a plate-shaped hint, or plate hint 128-P, that is covering a 3D object 126. In this example, the 3D object 126 is a pot having a vessel and a long handle. The plate hint 128-P is designed to have an area that can at least partially cover the 3D object 126. The plate hint 128-P is illustrated as being rectangular. However, a plate hint 128-P can take other shapes, such as oval, circular, a shape that tracks or mirrors a cross-sectional area of the 3D object 126, and so forth. Also, although the illustrated plate hint 128-P is shown as being substantially planar, a plate hint 128-P or a structure including the plate hint 128-P may have some amount of thickness or vertical dimension. Further, a plate hint 128-P can be any architected shape that includes a planar area for shielding the corresponding 3D object 126.

In FIG. 8, a minimum gap 804 (λ) is shown between the top of the 3D object 126 and the plate hint 128-P. The hint generation module 204 specifies the position 308 so as to create the minimum gap 804 based on the location 306 of the 3D object 126. The minimum gap 804 can be preset, can be calculated on a case-by-case basis, or can be usable-selectable. The minimum gap 804 can be established as a distance that is sufficient to reduce the likelihood that contact with the plate hint 128-P will permit a force to be transferred to the 3D object 126 that is located under the plate hint 128-P. More generally, a gap range can be specified that establishes a minimum distance and a maximum distance between the plate hint 128-P and the 3D object 126. A known or determinable gap range provides guidance to an end user as to how much distance to expect between the plate hint 128-P and the 3D object 126, or a shell hint 128-S surrounding the 3D object 126 (as shown in FIGS. 1, 9, and 10).

In some implementations, a printer interface module 206 controls a 3D printer to print a projection 608 onto a surface, such as an upper surface, of the plate hint 128-P. The projection 608 represents a visual appearance of the 3D object 126 that is being covered by the plate hint 128-P. In FIG. 8, the projection 608 represents a top view of the pot with the long handle. As shown, the projection 608 is printed as multiple characteristics 602 on the surface of the plate hint 128-P with at least one color using the pigment 314 of FIG. 3. Alternatively, the projection 608 of the visual appearance of the 3D object 126 can be printed as physical characteristics 602 in a 3D relief using the granules 124 to produce one or more textures.

Generally, the plate hint 128-P can indicate one or more aspects of the underlying 3D object 126. In FIG. 8, the indicated aspect of the 3D object 126 is a visual appearance thereof. However, the aspect can alternatively represent different relative strengths of different parts of the 3D object 126, in manners analogous to those described above with regard to FIGS. 6 and 7 for a shell-shaped hint implementation. For example, physical characteristics 602 that correspond to handle parts of the 3D pot can indicate relative fragility, and physical characteristics 602 that correspond to the vessel parts of the 3D pot can indicate relative sturdiness. In an example combined implementation, different textures can be printed on the upper surface of the plate hint 128-P as a texture-relief strength heat map to represent different relative strengths of the 3D object 126. Further, pigments can also be applied to the upper surface, such as by overlaying the texture-relief strength heat map, to represent a visual appearance of the 3D object 126. Alternatively, printed colors can be used to simultaneously represent both a visual appearance and a strength heat map of the underlying 3D object 126.

Figure 9:
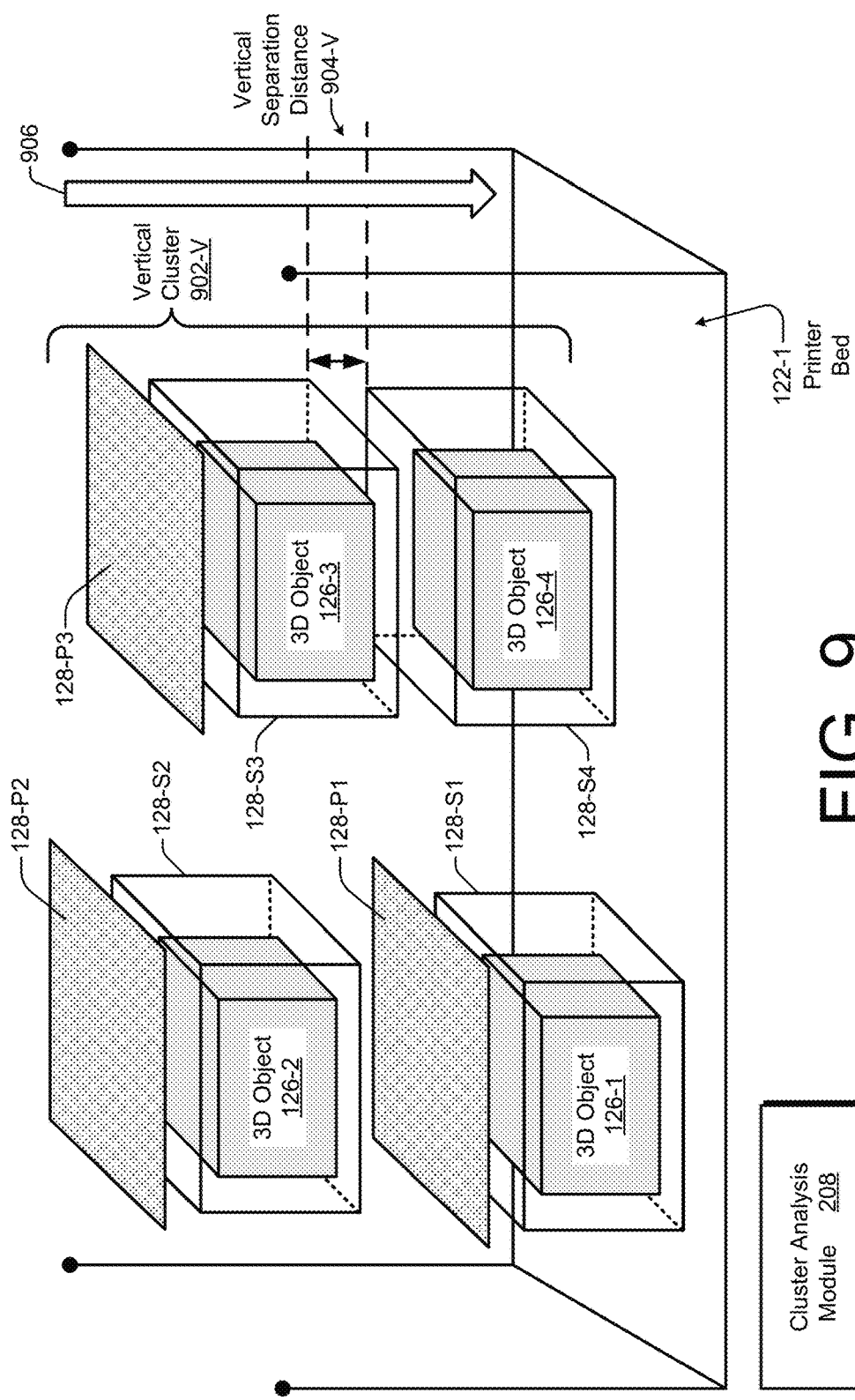
FIG. 9 depicts a printer bed illustrating an example grouping of multiple 3D objects into a vertical cluster under a single plate hint.
Figure 10:
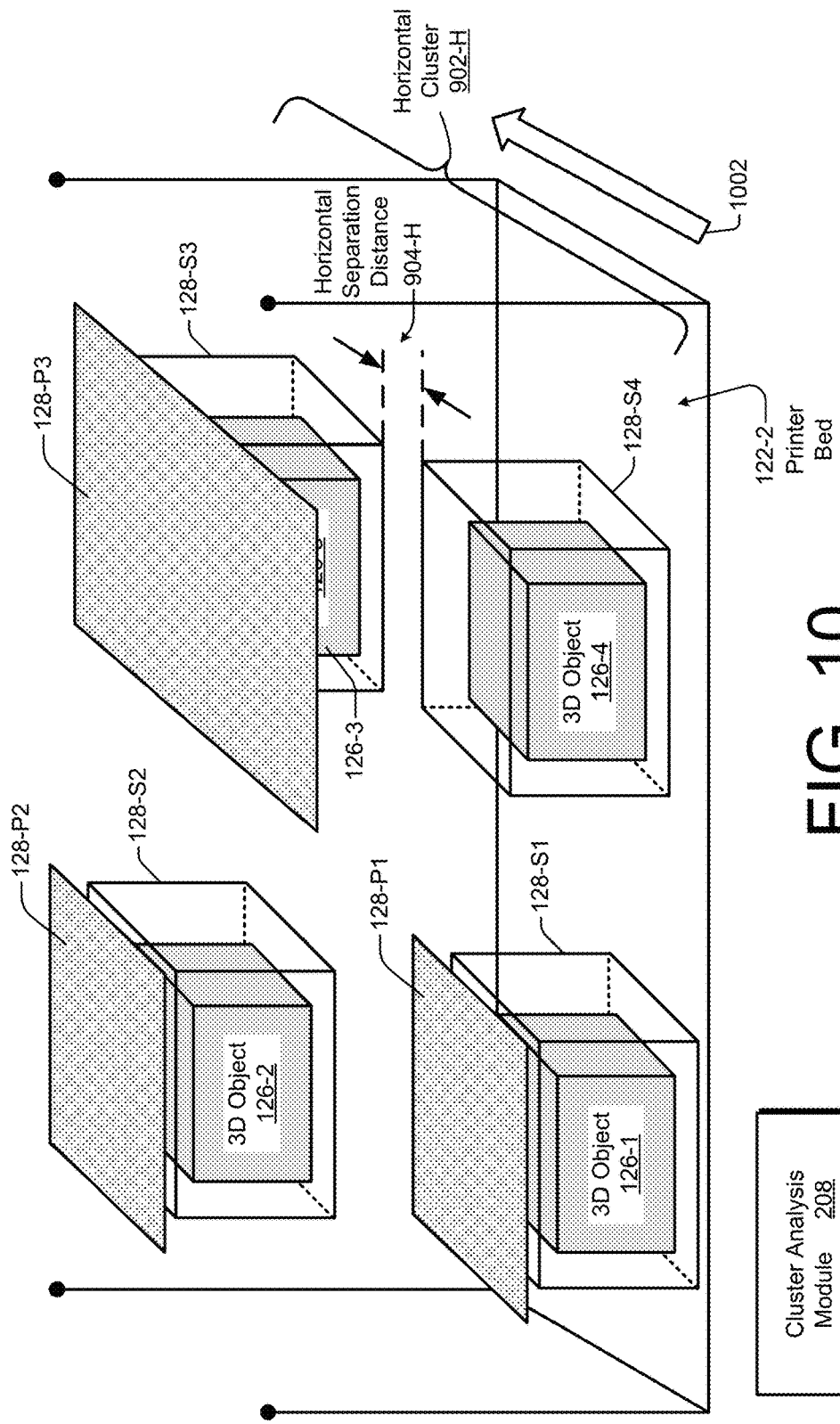
FIG. 10 depicts a printer bed illustrating an example grouping of multiple 3D objects into a horizontal cluster under a single plate hint.

FIGS. 9 and 10 illustrate example approaches to grouping two or more 3D objects 126 into a cluster 902 if the 3D objects are sufficiently close together, which can be based on a separation distance 904, as is described below. FIG. 9 depicts a printer bed 122-1 that illustrates a grouping of multiple 3D objects 126 into a vertical cluster 902-V under a single plate hint 128-P3. FIG. 10 depicts a printer bed 122-2 that illustrates a grouping of multiple 3D objects 126 into a horizontal cluster 902-H under a single plate hint 128-P3. In both FIG. 9 and FIG. 10, four 3D objects 126 and three plate hints 128-P are shown. The four 3D objects include: a first 3D object 126-1, a second 3D object 126-2, a third 3D object 126-3, and a fourth 3D object 126-4. The three plate hints include: a first plate hint 128-P1, a second plate hint 128-P2, and a third plate hint 128-P3. In these examples, each first, second, third, and fourth 3D object 126-1, 126-2, 126-3, and 126-4 is respectively surrounded by a first, second, third, and fourth shell hint 128-S1, 128-S2, 128-S3, and 128-S4. However, the clustering principles described here are applicable to scenarios that implement plate hints 128-P without shell hints 128-S.

In FIG. 9, a cluster analysis module 208 performs a clustering analysis in the vertical direction as indicated by an arrow 906. Generally, if a vertical separation space 904-V between two different 3D objects 126 is less than a vertical clustering threshold (not shown), the two 3D objects 126 are grouped into a vertical cluster under one plate hint 128-P. The vertical clustering threshold can be set based on a minimum vertical distance that would be used to safely insert a plate hint 128-P between two 3D objects 126 and have ample cushioning space for intervening granules 124. Hence, the vertical clustering threshold may be larger if shell hints are not employed because fragile parts of the 3D objects 126 are exposed. In such cases, providing a greater separation distance is prudent.

The vertical separation distance between the first 3D object 126-1 and the second 3D object 126-2 exceeds the vertical clustering threshold, so each first and second 3D object 126-1 and 126-2 has a separate respective first and second plate hint 128-P1 and 128-P2. On the other hand, the vertical separation distance 904-V between the third 3D object 126-3 and the fourth 3D object 126-4 is less than the vertical clustering threshold. Consequently, the third 3D object 126-3 and the fourth 3D object 126-4 are grouped into the indicated vertical cluster 902-V under a single plate hint, the third plate hint 128-P3. As shown in FIG. 9, because each 3D object 126 is encapsulated within a shell hint 128-S, the vertical separation distance 904-V is measured between the third shell hint 128-S3 and the fourth shell hint 128-S4.

In FIG. 10, a cluster analysis module 208 performs a clustering analysis in the horizontal direction as indicated by an arrow 1002. Generally, if a horizontal separation space 904-H between two different 3D objects 126 is less than a horizontal clustering threshold (not shown), the two 3D objects 126 are grouped into a horizontal cluster under one plate hint 128-P. The horizontal clustering threshold can be set based on a minimum horizontal distance that would be used to print two separate plate hints 128-P next to each other over the two 3D objects 126. Separate plates can be used if, for instance, the two 3D objects 126 can be separately extracted without jointly considering the physical structures of both objects, or the corresponding shell hints thereof. It is prudent to use a single plate 128-P if the two 3D objects 126 overlap such that individual projections of both would overlap on a single plate 128-P.

The horizontal separation distance between the first 3D object 126-1 and the second 3D object 126-2 exceeds the horizontal clustering threshold, so each first and second 3D object 126-1 and 126-2 has a separate respective first and second plate hint 128-P1 and 128-P2. On the other hand, the horizontal separation distance 904-H between the third 3D object 126-3 and the fourth 3D object 126-4 is less than the horizontal clustering threshold. Consequently, the third 3D object 126-3 and the fourth 3D object 126-4 are grouped into the indicated horizontal cluster 902-H under a single plate hint, the third plate hint 128-P3. As shown in FIG. 10, because each 3D object 126 is encapsulated within a respective shell hint 128-S, the horizontal separation distance 904-H is measured between the third shell hint 128-S3 and the fourth shell hint 128-S4.

An example algorithm for combining a vertical and a horizontal clustering analysis is described below. In general situations, if multiple 3D objects 126 are being printed in a single print run, there are multiple locations 306 (of FIG. 3) in the printer bed 122 that respectively correspond to multiple 3D objects 126. If clustering is implemented, a single hint 128—such as a single plate hint 128-P—can indicate multiple locations 306 of multiple 3D objects 126, or a single joint location 306. To perform a two-dimensional cluster analysis, a cluster analysis module 208 groups the multiple 3D objects 126 into a cluster 902 in at least one of a vertical direction as indicated by the arrow 906 or a horizontal direction as indicated by the arrow 1002 based on the multiple locations 306. If a cluster 902 is created, the resulting plate hint 128-P corresponds to a space (e.g., a volume or an area) occupied by the multiple 3D objects that are grouped into the cluster 902. Thus, the third plate hint 128-P3 is designed to at least partially cover both the third 3D object 126-3 and the fourth 3D object 126-4.

The example combined clustering analysis algorithm is described in terms of using both shell hints and plate hints to protect 3D objects and facilitate their extraction. The overall clustering analysis is performed to determine what plate hints are to be printed along with multiple 3D objects and their corresponding shell hints. A horizontal clustering analysis is conducted prior to a vertical clustering analysis. To perform the horizontal clustering analysis, for each 3D object that is to be built in a printer bed, the cluster analysis module 208 computes a top projection of the shell hint that is to be formed around the 3D object. A horizontal cluster 902-H is created for those 3D objects that have an intersecting top projection; this is equivalent to setting a zero or negligible horizontal clustering threshold.

To perform the vertical clustering analysis, the cluster analysis module 208 computes a vertical separation distance between the various shell hints, including those for each created horizontal cluster 902-H. The 3D objects that are located sufficiently close to each other so as to be within a vertical clustering threshold are grouped into respective vertical clusters 902-V. Projections are then determined for the resulting plate hints. For each vertical cluster 902-V that is created, the cluster analysis module 208 computes the union of the top projections through the multiple shell hints that are present in the vertical cluster 902-V. The cluster analysis module 208 also prepares the hint description 310 for each plate hint so as to include the union of the top projections on an upper surface of the plate hint. The hint generation module 204 also specifies the plate hint to have a positon 308 that is at least a minimum gap 804 above the top-most 3D object in the vertical cluster 902-V.

Having discussed example details of systems, techniques, and schemes for facilitating the extraction of 3D objects with printed hints, consider now some example procedures to illustrate additional aspects of the techniques.

Example Procedures

This section describes with reference to FIGS. 11-14 example procedures in one or more implementations for facilitating the extraction of a 3D object with a printed hint. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some implementations, the procedures may be performed by a suitably configured device, such as a computing device 102 (of FIG. 1) or a computing device 1502 (of FIG. 15)—in association with a 3D printer 120. Such devices can include a 3D object extraction module 118 (e.g., of FIGS. 1, 2, and 15).

Figure 11:
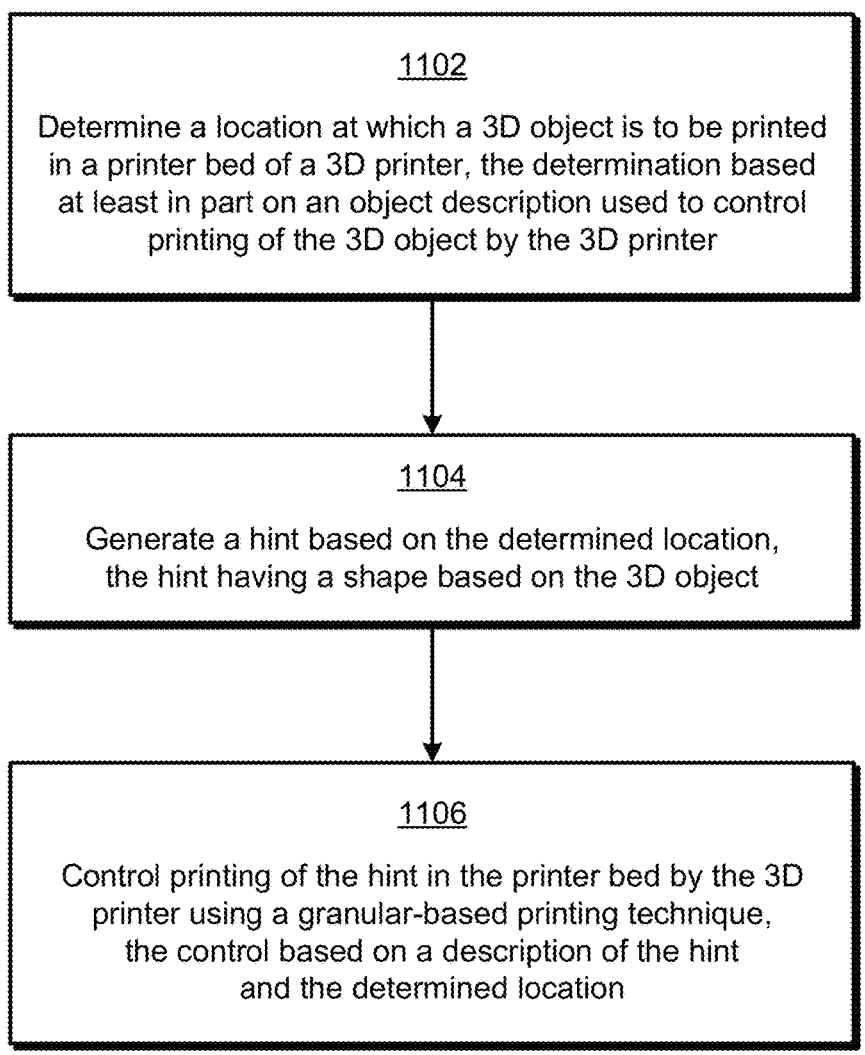
FIG. 11 is a flow diagram illustrating an example procedure in accordance with one or more example implementations.

FIG. 11 is a flow diagram that includes three blocks 1102-1106 and that illustrates an example procedure 1100 for facilitating the extraction of a 3D object with a printed hint in accordance with one or more example implementations. At block 1102, a location at which a 3D object is to be printed in a printer bed of a 3D printer is determined, with the determination based at least in part on an object description used to control printing of the 3D object by the 3D printer. For example, an object location determination module 202 can determine a location 306 at which a 3D object 126 is to be printed in a printer bed 122 of a 3D printer 120. The determination can be based at least partly on an object description 304 that is used to control printing of the 3D object 126 by the 3D printer 120. The object location determination module 202 may make the determination independently, responsive to user input, based on guidance from another device or application, some combination thereof, and so forth.

At block 1104, a hint is generated based on the determined location, with the hint having a shape that is based on the 3D object. For example, a hint generation module 204 can generate a hint 128 based on the determined location 306, with the hint 128 having a shape that is based on the 3D object 126. The shape of the hint 128 may be based on a size of the 3D object 126, such as a cross-sectional area of the 3D object or a volume occupied by 3D object. Additionally or alternatively, the shape of the hint 128 may be based on the determined location 306 of the 3D object 126, the shape of the 3D object 126, some combination thereof, and so forth.

At block 1106, the printing of the hint in the printer bed by the 3D printer is controlled based on a description of the hint and the determined location. For example, a printer interface module 206 can control the printing of the hint 128 in the printer bed 122 by the 3D printer 120 using a granular-based printing technique. The control is based on a hint description 310 for the hint 128 and the determined location 306 of the 3D object 126. A hint printing control module 212 may, for instance, cause the 3D printer 120 to bind granules 124 into a shape for the printed hint 128 using the structural specification of the hint description 310. The printing is controlled so that the printed hint 128 is indicative of the determined location 306 at which the 3D object 126 is printed in the printer bed 122. The shape of the printed hint 128 or a positon 308 of the printed hint 128 may be indicative of the determined location 306 of the 3D object 126.

Figure 12:
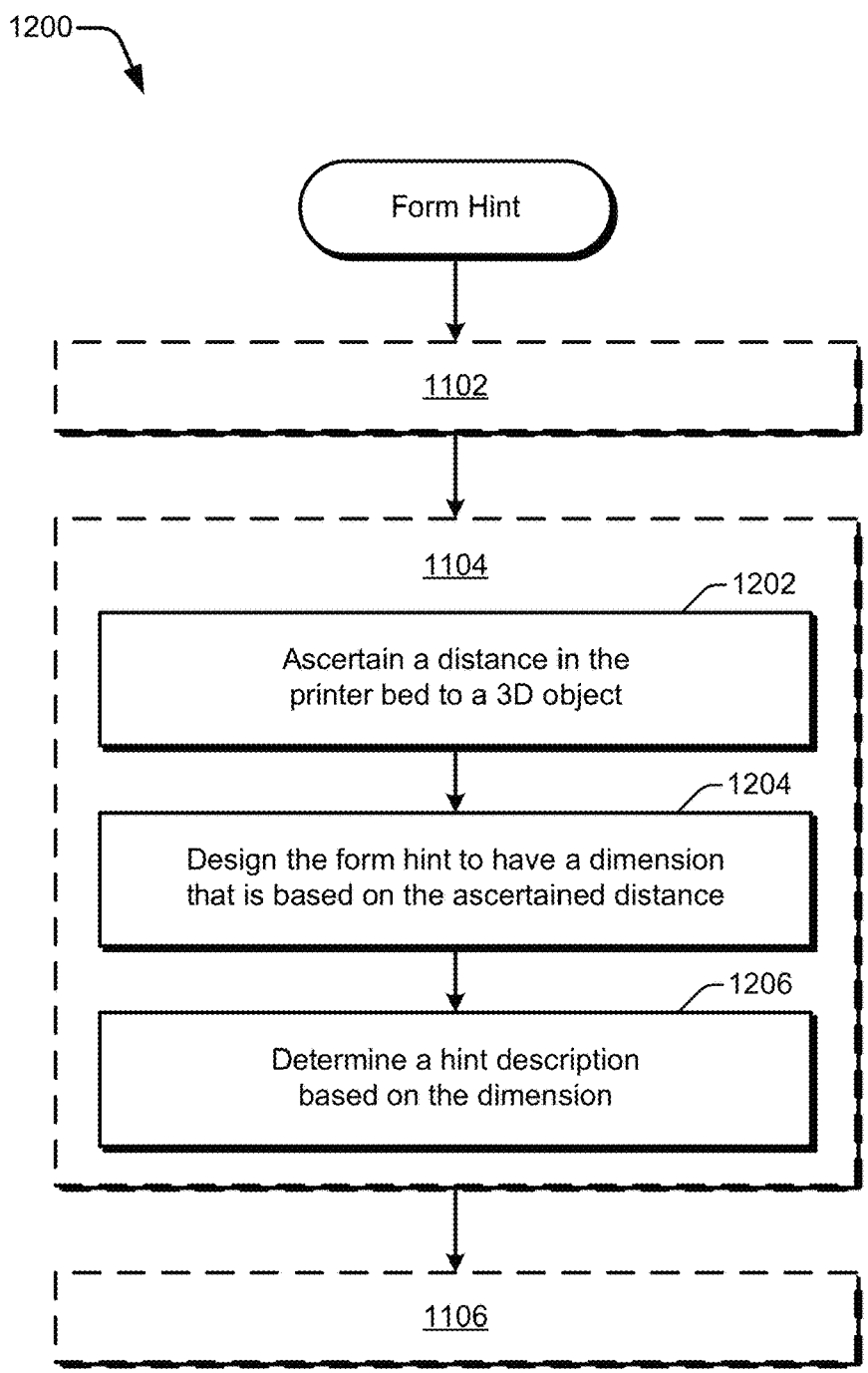
FIGS. 12, 13, and 14 are other flow diagrams illustrating example implementations of the flow diagram of FIG. 11 for a form hint, a shell hint, and a plate hint, respectively.
Figure 13:
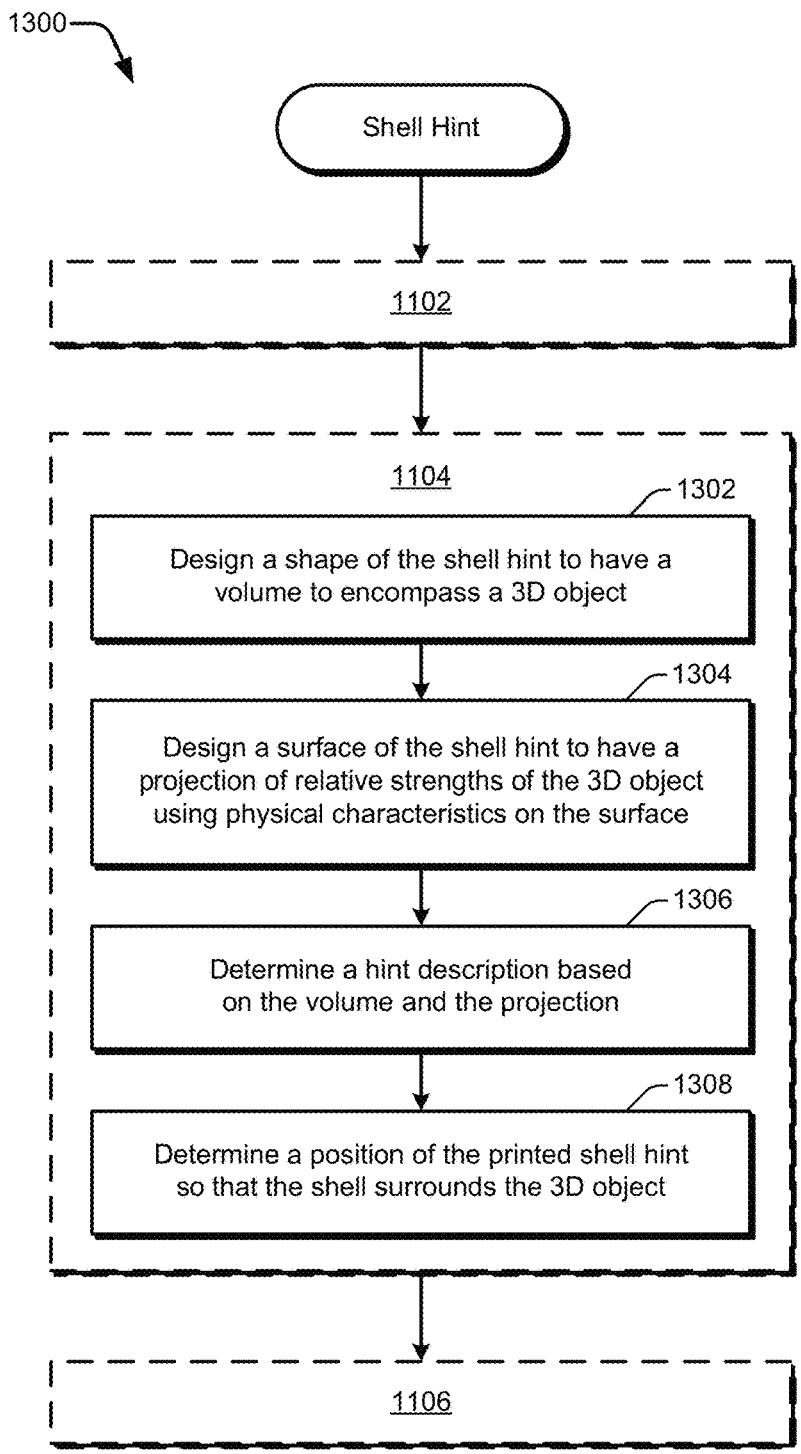
Figure 14:
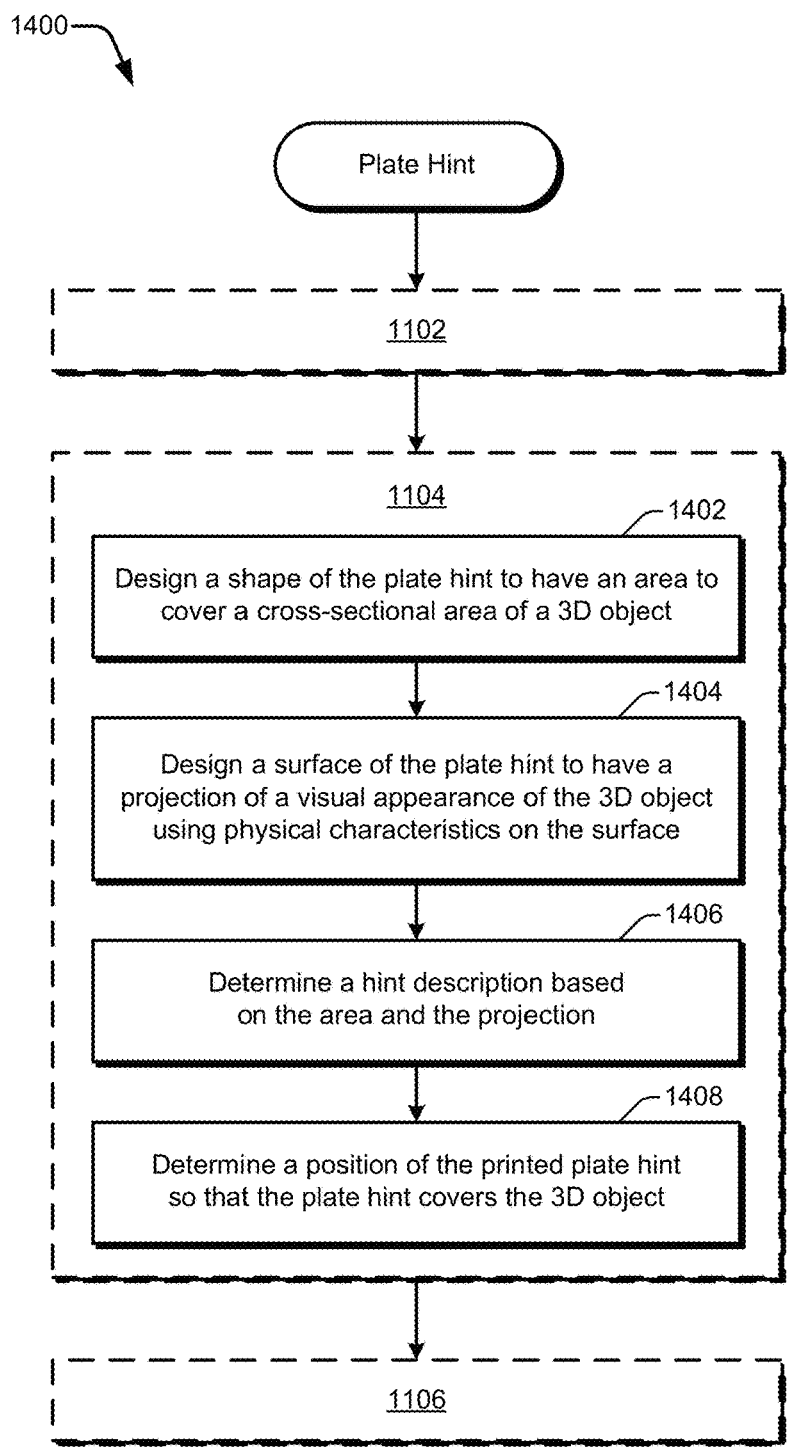

FIGS. 12, 13, and 14 are other flow diagrams illustrating example implementations of the block 1104 of FIG. 11 for a form hint, a shell hint, and a plate hint, respectively. A hint generation module 204 can, for example, perform the operations described with reference to FIGS. 12-14. FIG. 12 is a flow diagram that includes three blocks 1202-1206 and that illustrates an example procedure 1200 for generating a form hint 128-F. At block 1202, a distance 402 to a 3D object 126 in a printer bed 122 is ascertained. For example, a depth to a shell hint 128-S that surrounds the 3D object 126 can be ascertained. At block 1204, the form hint 128-F is designed to have a dimension 404 that is based on the ascertained distance 402. For instance, a rod-shaped form hint 128-F can be designed to have a length that is substantially equal to the depth to the shell hint 128-S. At block 1206, a hint description 310 is determined based on the dimension 404. The hint generation module 204 can thus specify the length for the rod-shaped form hint 128-F in a structural description for the hint.

FIG. 13 is a flow diagram that includes four blocks 1302-1308 and that illustrates an example procedure 1300 for generating a shell hint 128-S. At block 1302, a shape of the shell hint 128-S is designed to have a volume to encompass a 3D object 126. For example, a capsule-shaped shell hint 128-S (e.g., a cylinder with at least one hemispherical endcap) can be designed to have a radius and a length that is sufficient to encapsulate a pitcher with an elongated neck and handle, as shown in FIG. 6. At block 1304, a surface of the shell hint 128-S is designed to include a projection 608 of relative strong and weak parts of the 3D object 126 using physical characteristics 602. For instance, colored dots or patches can be designed into an external surface of the capsule-shaped shell hint 128-S, with different colors representative of different strength levels. At block 1306, a hint description 310 is determined based on the volume and the projection 608. Thus, the hint generation module 204 can stipulate measurements and physical structural specifications for the shell hint 128-S, including a shell thickness 502. At block 1308, a position 308 for printing the shell hint 128-S is determined so that the shell shape surrounds the 3D object 126. The position 308 is dependent on the location 306 of the 3D object 126 in the printer bed 122 and can be dependent on a minimum gap 504 between the 3D object 126 and the shell hint 128-S.

FIG. 14 is a flow diagram that includes four blocks 1402-1408 and that illustrates an example procedure 1400 for generating a plate hint 128-P. At block 1402, a shape of the plate hint 128-P is designed to have an area to cover a cross-sectional area of a 3D object 126. For example, a hint generation module 204 can design the plate hint 128-P to have an oval or rectangular shape having an area that can at least substantially cover an area occupied by a vessel and a handle of a pot, as shown in FIG. 8. A plate hint 128-P can substantially cover a 3D object 126 if the plate hint covers at least three-fourths of the 3D object, covers the relatively weaker parts of the 3D object, covers enough of the 3D object that a probing tool being thrust downward to the side of the plate hint avoids the underlying 3D object, covers an associated shell hint surrounding the 3D object, some combination thereof, and so forth. At block 1404, a surface of the plate hint 128-P is designed to have a projection 608 of a visual appearance of the 3D object 126 using physical characteristics 602. To do so, a 3D appearance of the 3D object 126 can be projected onto an upper side of the 2D surface of the plate hint 128-P and then printed using at least one color or texture.

At block 1406, a hint description 310 is determined based on the area and the projection 608. Thus, the hint generation module 204 can stipulate measurements and physical structural specifications for the plate hint 128-P, including a plate thickness, a degree of rounding for any corners of the plate, and any printed colors or textures. At block 1408, a position 308 for printing the shell plate 128-P is determined so that the plate shape covers the 3D object 126. The position 308 is dependent on the location 306 of the 3D object 126 in the printer bed 122 and can be dependent on a minimum gap 804 between the 3D object 126 and a lower side of the surface of the plate hint 128-P.

Having described example procedures in accordance with one or more implementations, consider now an example system and device that can be utilized to implement the various schemes and techniques described herein.

Example System and Device

Figure 15:
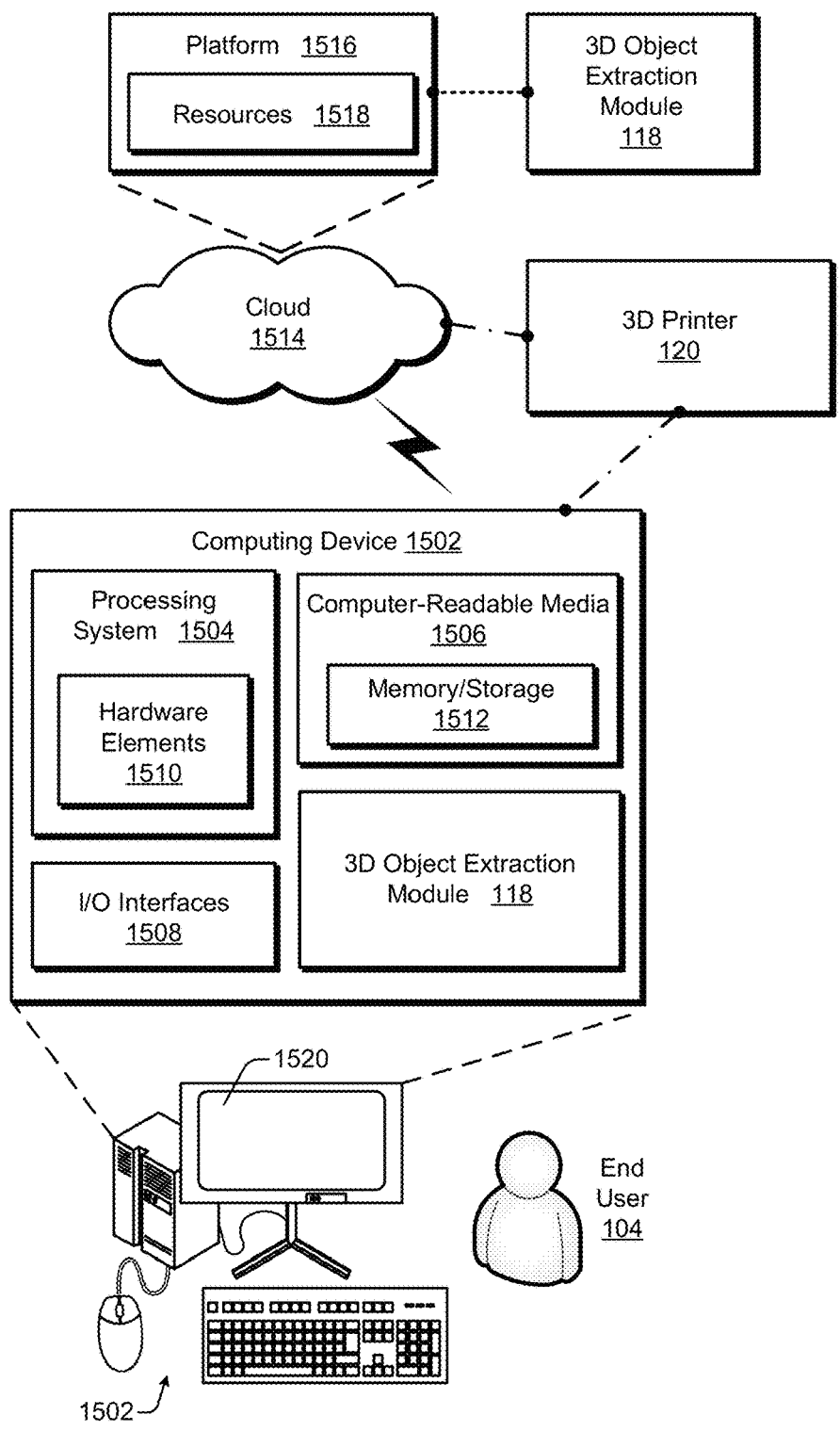
FIG. 15 illustrates an example system including various components of example computing devices that can implement techniques for facilitating the extraction of 3D objects using one or more printed hints.

FIG. 15 illustrates generally at 1500 an example system including an example computing device 1502 representative of one or more computing systems or computing devices that may implement the various techniques described herein. This is depicted through the inclusion of a 3D object extraction module 118, which may operate as described herein above, as well as a 3D printer 120. A computing device 1502 may be implemented as, for example, a computing device 102 (e.g., of FIG. 1) in an independent or standalone mode. The computing device 1502 can execute an application or operating system that is capable of detecting user input and presenting visible output for an end user 104, such as via a display screen 1520 or the 3D printer 120. Generally, a computing device 1502 may be implemented as, for example, an end user device (e.g., a smart phone or desktop computer) of the end user 104, a corporate device (e.g., a server side device or data center hardware) of a business, an on-chip system or system-on-a-chip (SOC) (e.g., that is integrated with a tablet device or a printer), or any other suitable computing device or computing system.

In an example implementation, which is also shown in FIG. 1, the 3D object extraction module 118 is executing at one location (e.g., within a housing of an end-user computing device 102 or a 3D printer 120). However, the 3D object extraction module 118 can alternatively be executing in the cloud (e.g., on a server or network-side computing device) to remotely provide printing commands to the 3D printer 120, and such an example cloud-based implementation is also shown in FIG. 15. Alternatively, a portion of the 3D object extraction module 118 can be executing at both a client-side computing device and a server-side computing device. In such an implementation, the operations implemented by the 3D object extraction module 118 as described herein may be distributed across a client-server architecture. Also, the computing device 1502 can be coupled to the 3D printer 120 locally or over one or more networks. In other alternative implementations, the 3D printer 120 and the computing device 1502 can be combined or integrated into a single housing unit such that the 3D printer 120 includes a processing system, computer-readable media, the 3D object extraction module 118, and so forth.

The example computing device 1502 as illustrated includes at least one processing system 1504, one or more computer-readable media 1506, and one or more I/O interfaces 1508 that may be communicatively coupled, one to another. Although not explicitly shown, the computing device 1502 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including one or more hardware elements 1510 that may be implemented as processors, functional blocks, and so forth. This may include implementation in hardware as an application specific integrated circuit (ASIC), a general-purpose processor, or other logic device formed using e.g. one or more semiconductors. The hardware elements 1510 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (e.g., random access memory (RAM)) or nonvolatile media (e.g., read only memory (ROM), flash memory, optical discs, or magnetic disks). The memory/storage component 1512 may include fixed media (e.g., RAM, ROM, or a fixed hard drive) or removable media (e.g., a flash memory card, a removable hard drive, or an optical disc). The computer-readable media 1506 may be implemented in a variety of other ways as further described below.

The input/output interface(s) 1508 are representative of functionality to allow a user to enter commands or information to computing device 1502 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., a liquid crystal display (LCD) screen, a light-emitting diode (LED) display screen, a monitor, or a projector), a speaker, a printer, a network card, a haptic vibrating device, or a combination thereof. Thus, the computing device 1502 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, fixed logic circuitry, or a combination thereof. The features of the techniques described herein may be platform-independent, meaning that the described techniques may be implemented on a variety of commercial computing platforms having a variety of processors.

An implementation of the described modules, and techniques thereof, may be stored on or transmitted across some form of computer-readable media. The computer-readable media 1506 may include a variety of media that may be accessed by the computing device 1502. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer readable instructions, data structures, program modules, logic elements/circuits, or other data. Examples of computer-readable storage media include RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1502, such as via a network. Computer-readable signal media may typically embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, computer-readable signal media include wired media, such as a wired network or direct wired connection, or wireless media, such as acoustic, RF, microwave, infrared, or other wireless media.

As previously described, hardware elements 1510 or computer-readable media 1506 may be representative of modules, programmable device logic, fixed device logic, a combination thereof, and so forth that are implemented in a hardware form that may be employed in some implementations to implement at least some aspects of the techniques described herein, such as to perform one or more instructions or computing actions. Hardware may include components of an integrated circuit (IC) or on-chip system, an ASIC, a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer readable storage media or by one or more hardware elements 1510. The computing device 1502 may be configured to implement particular instructions or functions corresponding to software or hardware modules. Accordingly, implementation of a module that is executable by the computing device 1502 as software may be achieved at least partially in hardware, e.g., through use of computer-readable storage media or the hardware elements 1510 of the processing system 1504. The instructions or functions may be executable/operable by one or more articles of manufacture (e.g., one or more computing devices 1502 or processing systems 1504) to implement techniques, modules, or examples described herein.

The techniques described herein may be supported by various configurations of the computing device 1502 and are not limited to the specific aspects of the example devices described herein. This functionality may also be implemented fully or partially through use of a distributed system, such as over a "cloud" 1514 via a platform 1516 as described below.

The cloud 1514 may include or represent a platform 1516 for resources 1518. The platform 1516 abstracts underlying functionality of hardware (e.g., one or more servers or at least one data center) and software resources of the cloud 1514. The resources 1518 may include applications or data that can be utilized while computer processing is at least partially executed on servers remote from, or distributed around, the computing device 1502. Resources 1518 may also include services provided over the Internet or through a subscriber network, such as a cellular or Wi-Fi network.

The platform 1516 may abstract resources and functions to connect the computing device 1502 with other computing devices or services. The platform 1516 may also serve to abstract a scaling of resources to provide a corresponding level of scale to encountered demand for the resources 1518 implemented via the platform 1516. Accordingly, in an interconnected device implementation, implementation of functionality described herein may be distributed throughout the illustrated system of FIG. 15, or at least throughout the cloud 1514 along with the computing device 1502. For example, functionality may be implemented in part on the computing device 1502 as well as via the platform 1516 that abstracts the functionality of the cloud 1514.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for three-dimensional (3D) printing, a method implemented by at least one computing device, the method comprising:
  determining, by the at least one computing device, a location at which a 3D object is to be printed in a printer bed of a 3D printer, the determining based at least in part on an object description used to control printing of the 3D object by the 3D printer;
  determining, by the at least one computing device, a depth at which the 3D object is to be printed in the printer bed based on the object description;
  generating, by the at least one computing device, a hint indicating the determined location and the determined depth of the 3D object in the printer bed; and controlling, by the at least one computing device, printing of the hint indicating the determined depth in the printer bed and the determined location of the 3D object by the 3D printer.

2. The method of claim 1, wherein the controlling comprises controlling the 3D printer to print the hint with a dimension indicative of the depth in the printer bed to the determined location of the 3D object.

3. The method of claim 1, wherein the generating comprises generating the hint to indicate that the determined location of the 3D object is below at least a portion of the hint in the printer bed.

4. The method of claim 3, wherein:
the hint comprises a plate that shields the 3D object to protect at least a top part of the 3D object during extraction from the printer bed; and
the controlling comprises controlling the 3D printer to print the hint above the 3D object in the printer bed.

5. The method of claim 4, wherein the controlling comprises controlling the 3D printer to print the hint above a cluster of 3D objects in the printer bed.

6. The method of claim 3, wherein:
the hint comprises a shell that armors the 3D object to protect at least a top and a side of the 3D object during extraction from the printer bed; and
the controlling comprises controlling the 3D printer to print the hint so as to surround at least part of the 3D object in the printer bed.

7. The method of claim 3, wherein the generating comprises generating the hint to include a projection of an aspect of the 3D object, the projection derived from the object description.

8. The method of claim 7, wherein the aspect of the 3D object comprises a visual appearance of the 3D object.

9. The method of claim 7, wherein the aspect of the 3D object comprises a strength heat map of different structural parts of the 3D object.

10. The method of claim 7, wherein the controlling comprises controlling the 3D printer to print a physical characteristic on a surface of the hint, the physical characteristic indicative of the aspect of the 3D object.

11. The method of claim 10, wherein the physical characteristic printed on the surface of the hint comprises at least one color or at least one texture that represents the aspect of the 3D object.

12. In a digital medium environment for three-dimensional (3D) printing, at least one computer-readable medium storing processor-executable instructions that, responsive to execution by a processing system, cause the processing system to perform operations comprising:
determining a location at which a 3D object is to be printed in a printer bed of a 3D printer, the determining based at least in part on an object description used to control printing of the 3D object by the 3D printer;
determining a cross section of the 3D object based on the object description;
generating a hint indicating the determined location, including generating a description of the hint and a position in the printer bed for printing the hint, the hint having a shape of the cross-section of the 3D object;
controlling printing of the 3D object in the printer bed by the 3D printer, the controlling based on the object description and the determined location; and
controlling printing of the hint in the printer bed by the 3D printer based on the description and the position of the hint, the printed hint indicative of the determined location of the 3D object in the printer bed.

13. The at least one computer-readable medium of claim 12, wherein:
the generating comprises generating the description to include a dimension for the hint that is based on a depth to the determined location of the 3D object in the printer bed; and
the dimension of the printed hint is indicative of the determined location of the 3D object in the printer bed.

14. The at least one computer-readable medium of claim 12, wherein:
the position of the printed hint is indicative of the determined location of the 3D object in the printer bed; and
the generating comprises generating the description to include an area for the hint that is based on a cross-sectional area of the 3D object such that the printed hint can substantially cover the 3D object in the printer bed.

15. The at least one computer-readable medium of claim 12, wherein:
the position of the printed hint is indicative of the determined location of the 3D object in the printer bed; and
the generating comprises generating the description to include an interior volume for the hint that is based on a volume occupied by the 3D object such that the printed hint can substantially surround the 3D object in the printer bed.

16. In a digital medium environment for three-dimensional (3D) printing, a method implemented by at least one computing device, the method comprising:
determining, by the at least one computing device, a location at which a 3D object is to be printed in a printer bed of a 3D printer, the determining based at least in part on an object description used to control printing of the 3D object by the 3D printer;
determining, by the at least one computing device, a visual appearance of the 3D object from the object description, the visual appearance including:
a texture of the 3D object;
an image of an overall structure of the 3D object;
an image of particular parts of the 3D object; or
a cross section of the 3D object;
generating, by the at least one computing device, a hint indicating the determined location and the determined visual appearance; and
controlling, by the at least one computing device, printing of the hint in the printer bed by the 3D printer as having the visual appearance as indicated in 3D relief as part of the hint.

* * * * *